(12) United States Patent
Eisenfeld et al.

(10) Patent No.: US 11,940,641 B2
(45) Date of Patent: Mar. 26, 2024

(54) TRANSVERSAL LIGHT PIPE

(71) Applicant: Lumus Ltd., Ness Ziona (IL)

(72) Inventors: Tsion Eisenfeld, Ashkelon (IL);
Jonathan Gelberg, Modiin (IL)

(73) Assignee: LUMUS LTD., Ness Ziona (IL)

( * ) Notice: Subject to any disclaimer, the term of this patent is extended or adjusted under 35 U.S.C. 154(b) by 103 days.

(21) Appl. No.: 17/642,748

(22) PCT Filed: Sep. 14, 2020

(86) PCT No.: PCT/IL2020/051005
§ 371 (c)(1),
(2) Date: Mar. 14, 2022

(87) PCT Pub. No.: WO2021/048864
PCT Pub. Date: Mar. 18, 2021

(65) Prior Publication Data
US 2022/0326426 A1    Oct. 13, 2022

Related U.S. Application Data

(60) Provisional application No. 62/900,552, filed on Sep. 15, 2019.

(51) Int. Cl.
*G02B 27/01*    (2006.01)
*F21V 8/00*    (2006.01)

(52) U.S. Cl.
CPC ......... *G02B 6/0008* (2013.01); *G02B 6/0006* (2013.01); *G02B 27/0172* (2013.01)

(58) Field of Classification Search
None
See application file for complete search history.

(56) References Cited

U.S. PATENT DOCUMENTS 5,096,520 A    3/1992    Faris
5,398,171 A *    3/1995    Davenport ........... G02B 6/4298
                                              362/335

(Continued)

FOREIGN PATENT DOCUMENTS

CN    109612384 A    4/2019
GB    2153546 A    8/1985
JP    2015099323    5/2015

OTHER PUBLICATIONS

Lynch et al. "Beam Manipulation: Prisms vs. Mirrors",Photonik International pp. 45-47. Mar. 2009. Available since Sep. 20, 2016 at the following URL: <http://www.edmundoptics.com/globalassets/resources/articles/beammanipulation-prisms-vs-mirrors-en.pdf> Lynch et al. Mar. 31, 2009 (Mar. 31, 2009).

(Continued)

*Primary Examiner* — Brian M Butcher
(74) *Attorney, Agent, or Firm* — Rivka Friedman

(57) ABSTRACT

A light pipe includes at least two optical structures having different refractive indices. An interface between the two optical structures is oblique to a longitudinal axis of the light pipe such that an output ray from an output surface at a distal end of the light pipe is non-parallel to an input ray that is parallel to the longitudinal axis at an input surface at a proximal end of the light pipe. Light refracts inside the light pipe between the (at least) two optical structures altering the direction of an optical path of the light through the light pipe, thereby allowing higher degrees of freedom for the selection of the angle of deviation (folding angle) of the light pipe. By optimizing various parameters of the light pipe, a desired output optical axis angle (i.e., folding angle) can be achieved that suits the desired optical engine envelope.

19 Claims, 14 Drawing Sheets

(56) References Cited

U.S. PATENT DOCUMENTS

| | | |
|---|---|---|
| 5,852,693 A | 12/1998 | Jeong et al. |
| 5,905,837 A | 5/1999 | Wang et al. |
| 6,394,607 B1 | 5/2002 | Hashizume et al. |
| 7,148,936 B1 | 12/2006 | Hirota et al. |
| 9,551,880 B2 | 1/2017 | Amitai |
| 10,007,046 B2 * | 6/2018 | Chung ............... G02B 6/0018 |
| 10,330,937 B2 | 6/2019 | Cheng et al. |
| 10,859,845 B2 | 12/2020 | Kyosuna et al. |
| 2002/0075454 A1 | 6/2002 | Hsiung |
| 2004/0095860 A1 | 5/2004 | Ariyoshi et al. |
| 2005/0017465 A1 | 1/2005 | Bergstrom |
| 2007/0000219 A1 | 1/2007 | Hashizume et al. |
| 2007/0159673 A1 | 7/2007 | Freeman et al. |
| 2008/0025667 A1 | 1/2008 | AMitai |
| 2009/0323482 A1 | 12/2009 | Nakanuma |
| 2010/0027289 A1 | 2/2010 | Aiki et al. |
| 2010/0033784 A1 | 2/2010 | Renaud |
| 2012/0002256 A1 | 1/2012 | Iacoste et al. |
| 2012/0068609 A1 | 3/2012 | Ide et al. |
| 2013/0021581 A1 | 1/2013 | Takahashi et al. |
| 2013/0335708 A1 | 12/2013 | Ouderkirk |
| 2015/0013105 A1 | 1/2015 | Kuan |
| 2015/0288937 A1 | 10/2015 | Tsai et al. |
| 2016/0116744 A1 | 4/2016 | Takeda et al. |
| 2016/0313567 A1 | 10/2016 | Kurashige |
| 2016/0334625 A1 | 11/2016 | Iba et al. |
| 2017/0045664 A1 | 2/2017 | Chung |
| 2017/0090094 A1 | 3/2017 | Ohsugi et al. |
| 2017/0242249 A1 | 8/2017 | Wall et al. |
| 2017/0276947 A1 | 9/2017 | Yokoyama |
| 2018/0120768 A1 | 5/2018 | Christmas |
| 2018/0129166 A1 | 5/2018 | Seo et al. |
| 2018/0188532 A1 | 7/2018 | Christmas |
| 2018/0262725 A1 | 9/2018 | Fan |
| 2018/0335629 A1 | 11/2018 | Cheng et al. |
| 2018/0373262 A1 | 12/2018 | Wu et al. |
| 2019/0018245 A1 | 1/2019 | Cheng et al. |
| 2019/0022731 A1 | 1/2019 | Yabuoshi |
| 2019/0196199 A1 * | 6/2019 | Matsuki ............. G02B 27/0172 |
| 2020/0012086 A1 * | 1/2020 | Kawahara ......... G02B 23/2469 |
| 2020/0183079 A1 | 6/2020 | Leister |
| 2020/0209667 A1 | 7/2020 | Sharlin et al. |
| 2020/0278558 A1 | 9/2020 | Yamamoto et al. |
| 2020/0326655 A1 | 10/2020 | Chang et al. |
| 2022/0197037 A1 | 6/2022 | Pennell et al. |
| 2022/0317467 A1 | 10/2022 | Danziger |
| 2022/0342216 A1 | 10/2022 | Danziger et al. |
| 2022/0373807 A1 | 11/2022 | Danziger et al. |
| 2023/0019309 A1 | 1/2023 | Chriki et al. |

OTHER PUBLICATIONS

M. Kivanc Hedili et al "Light-efficient augmented reality display with steerable eyebox", Optics Express vol. 27, Issue 9, pp. 12572-12581 (2019) •https://doi.org/10.1364/OE.27.012572.

* cited by examiner

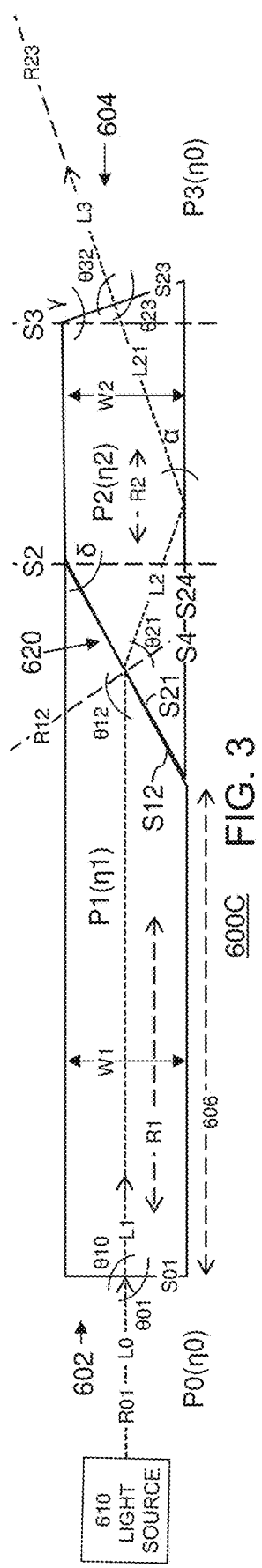
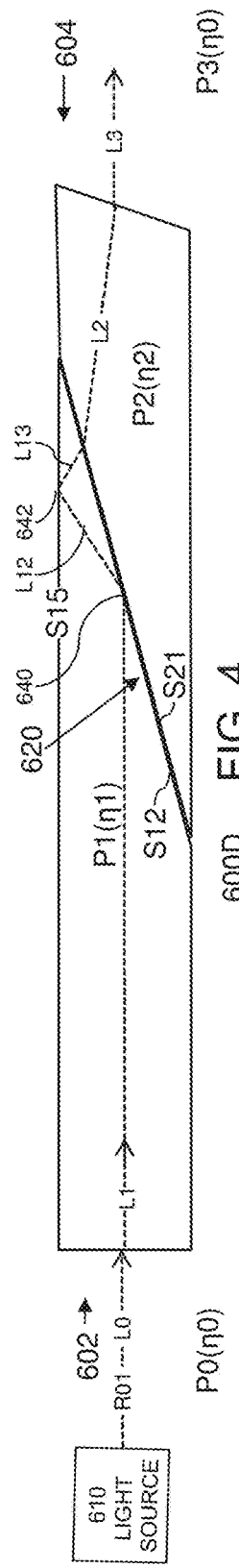
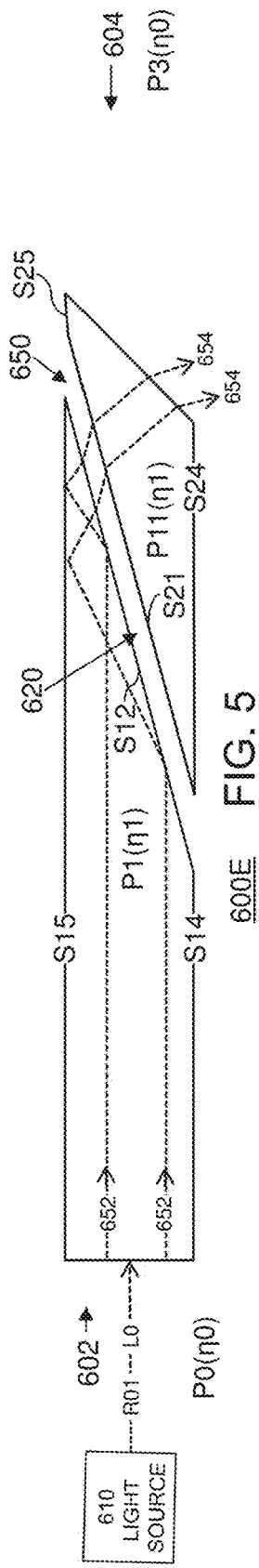

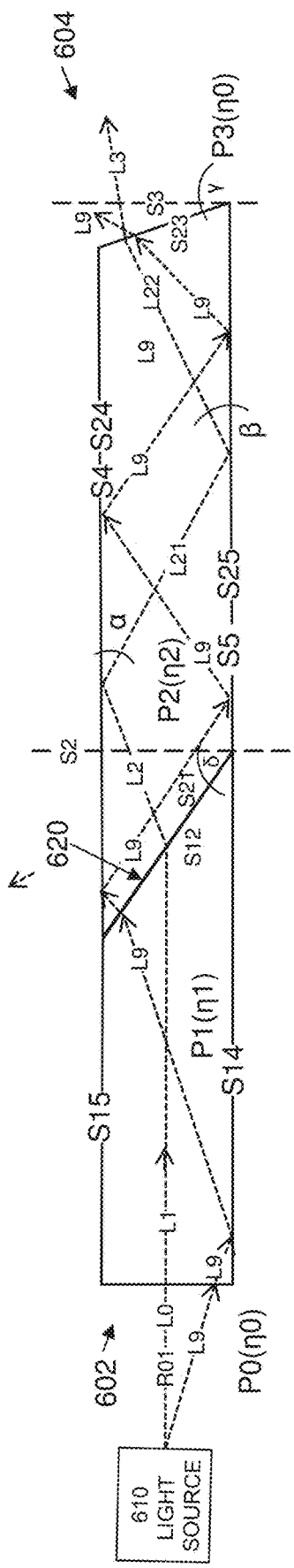
600F FIG. 7
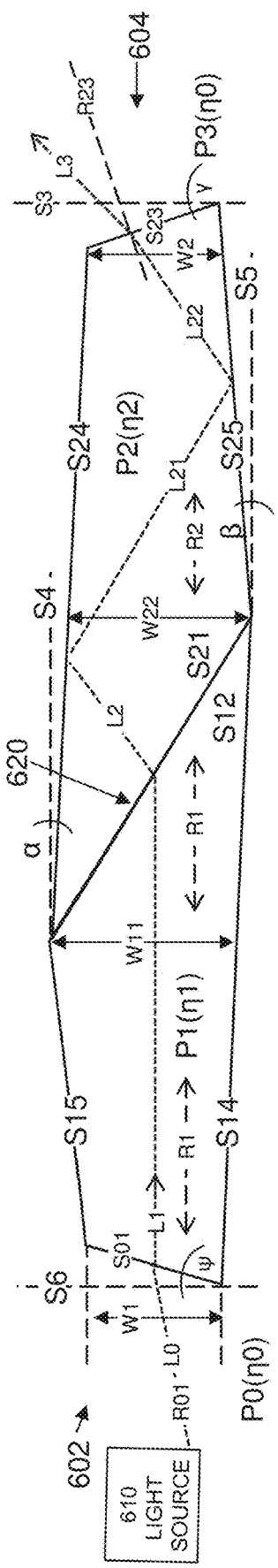
600G FIG. 9

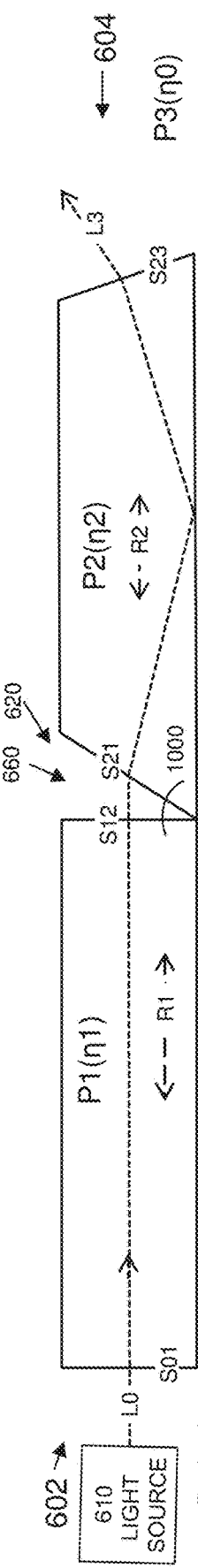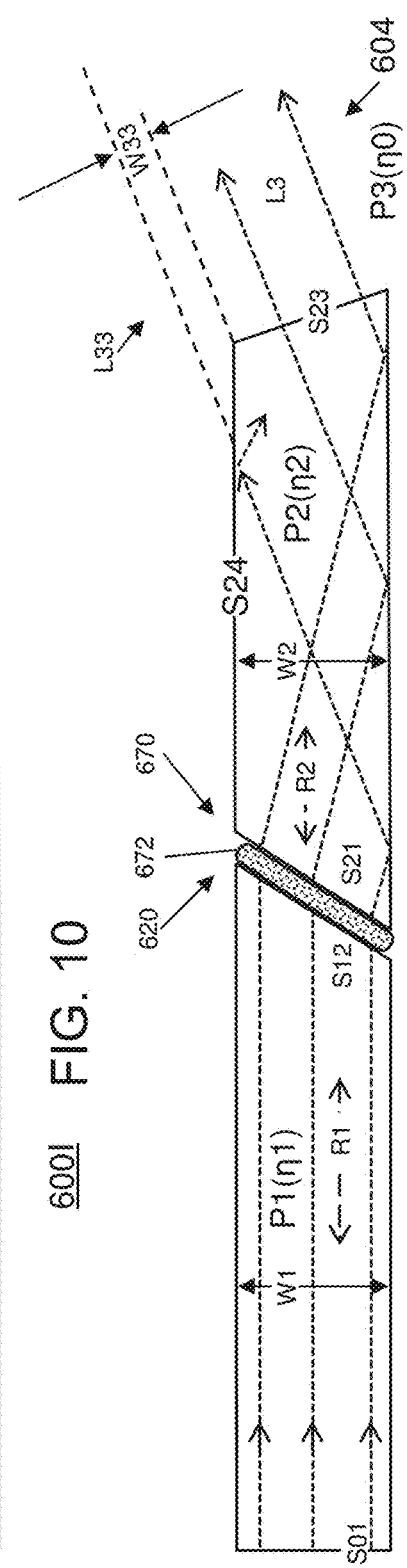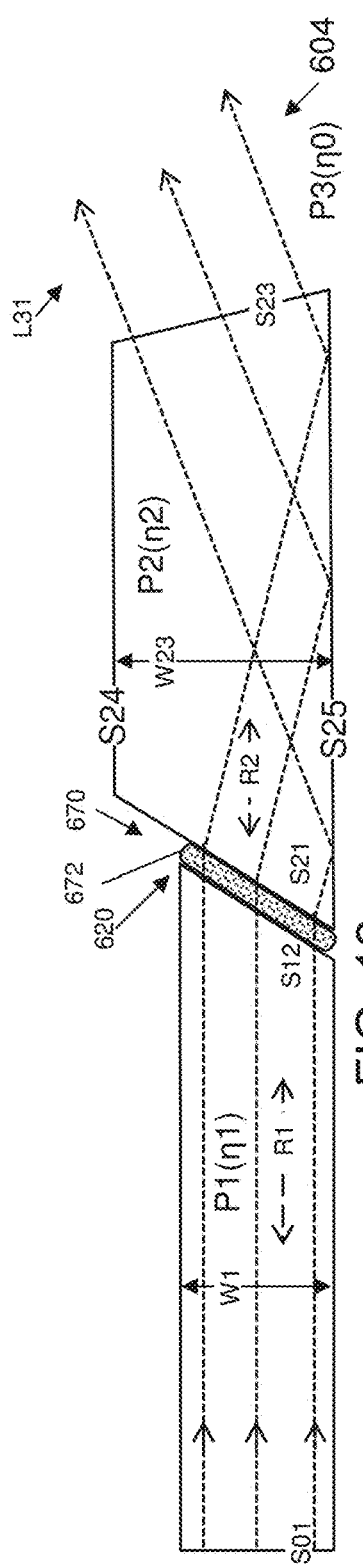

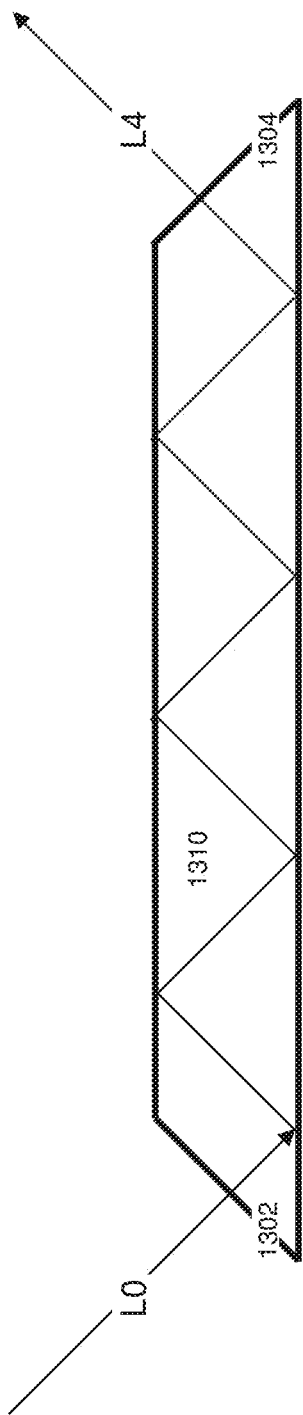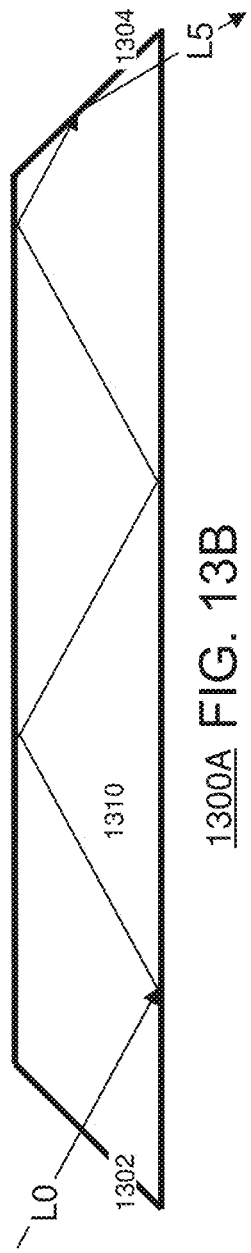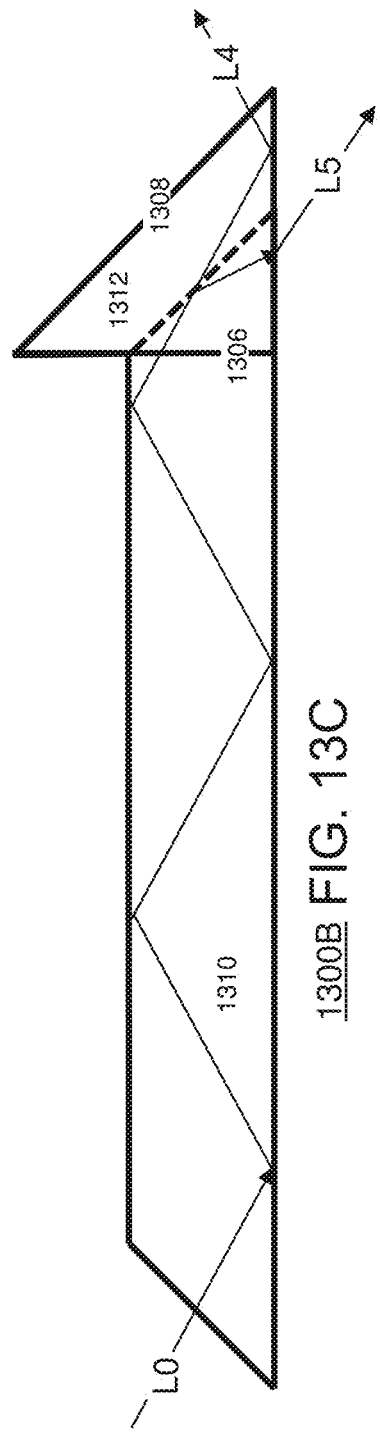

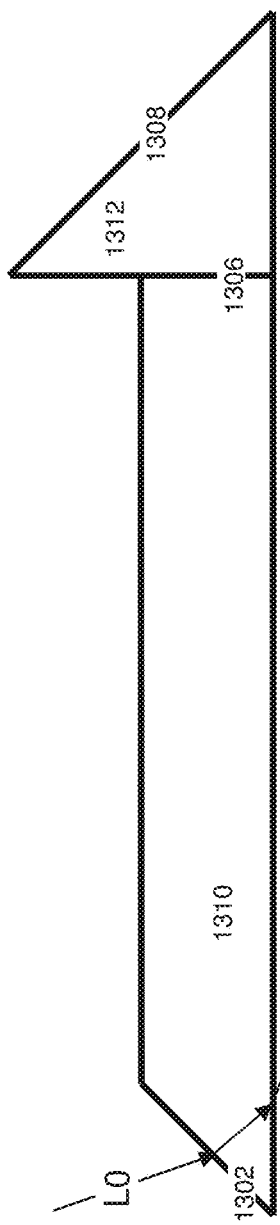
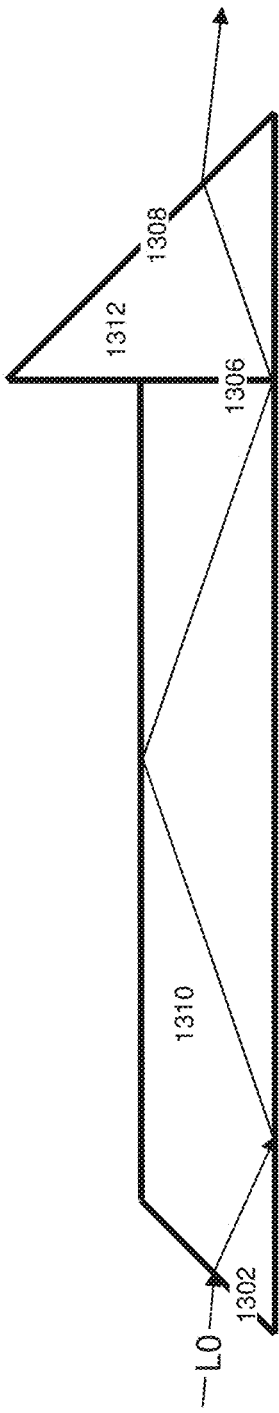
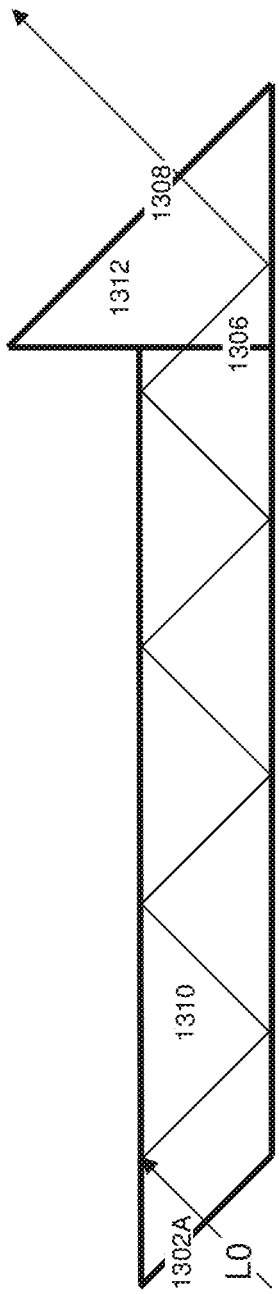

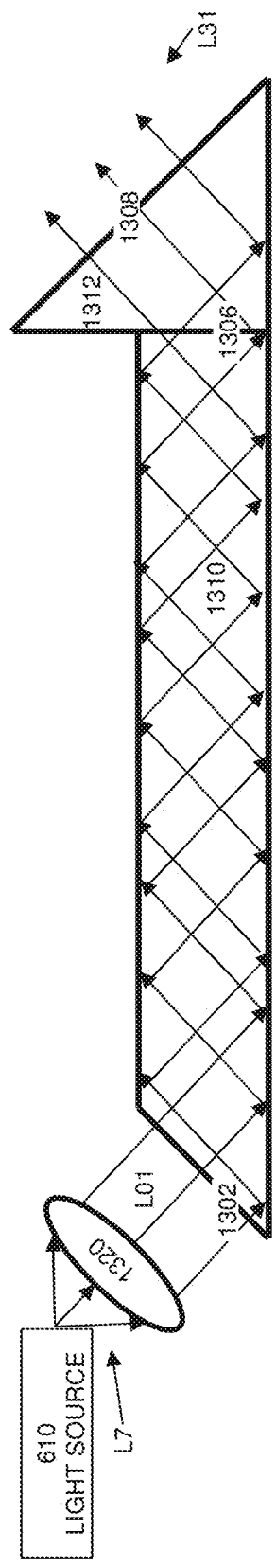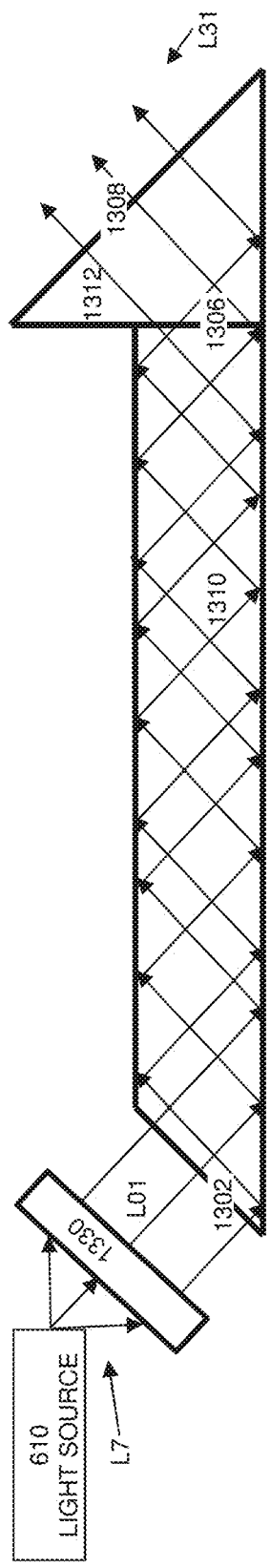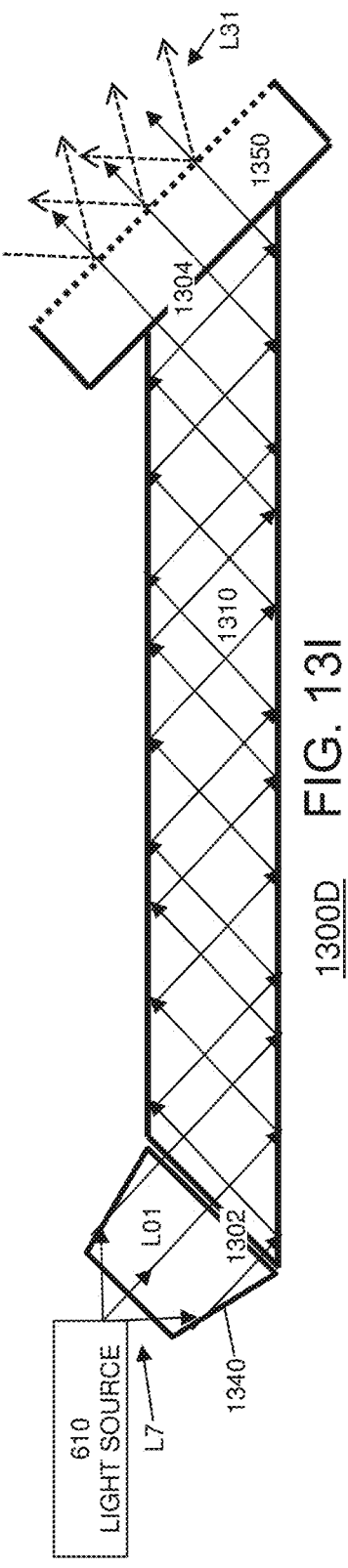

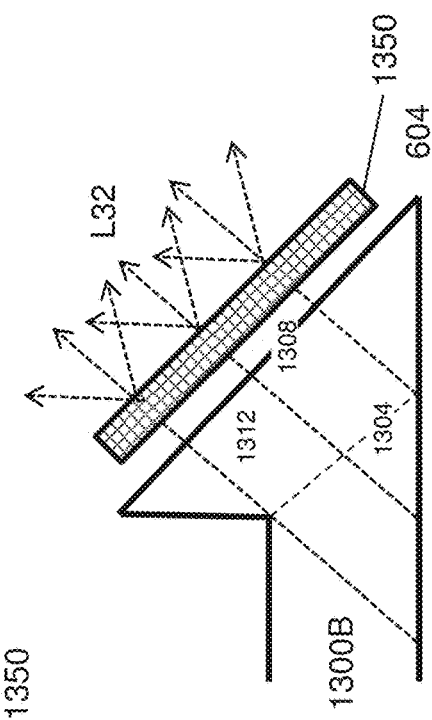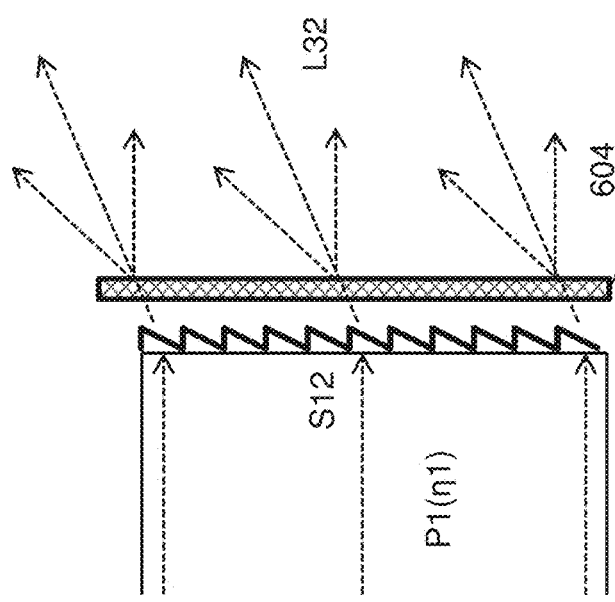

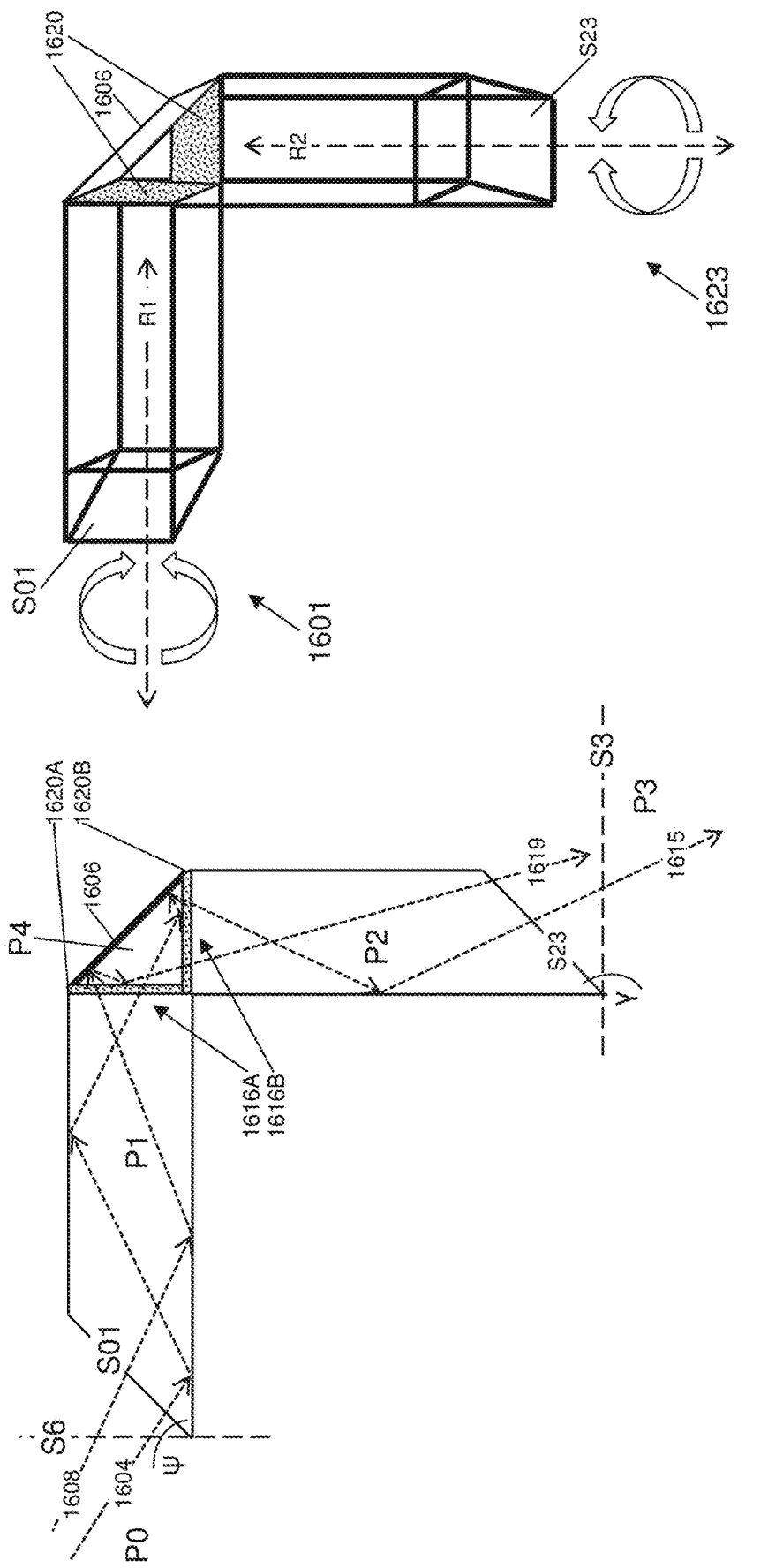

TRANSVERSAL LIGHT PIPE

FIELD OF THE INVENTION

The present invention generally relates to optical light pipes, and in particular, it concerns light pipes that can be used to illuminate electronic display sources (such as liquid crystal on silicon (LCOS) microdisplays used to inject an image into an optical waveguide of a near eye display), having an optical axis (light path) that can be folded at any desired folding angle relative to associated system components.

BACKGROUND OF THE INVENTION

In augmented reality systems, fitting the optical system shape and form factor in an aesthetic wearable frame is a challenge, in particular when mixing different light (e.g., LED) source colors is required. One method of mixing different light source channels together is the use of a light pipe for producing illumination. For aesthetic reasons, it is desirable to have the light pipe aligned with the frame of the glasses. However, light pipes are relatively long elements which often protrude the desired optical engine envelope. Therefore, folding the light pipe in any desired direction is critical in order to achieve an aesthetic shape.

In addition to being relatively long elements, light pipes are typically also relatively straight. In order to somewhat maintain the light pipe in the desired optical engine envelope, curved light pipe designs have been proposed which implement the light pipe as a banded optical fiber. However, banded optical fiber implementations result in low efficiency due to the fact that the rays propagating within the curved banded optical fiber cannot propagate by total internal reflection along the propagation axis. Alternative folding solutions have been proposed in which the light pipe is folded using a right-angled prism (i.e., 90-degree prism) with a reflective coating (i.e., mirror coating). While such solutions yield higher efficiency, these solutions are significantly limited to specific folding angles.

SUMMARY

According to the teachings of the present embodiment there is provided an apparatus including: a light pipe including at least: (i) a first optical structure having a first refractive index, an input surface at a proximal end of the lightpipe, and a second surface, and (ii) a second optical structure having a second refractive index not equal to the first refractive index, a third surface, and an output surface at a distal end of the lightpipe, the light pipe having a longitudinal axis parallel to a long dimension of the first optical structure in a direction between the input surface, and the second surface, and an interface between the second surface and the third surface being oblique to the longitudinal axis of the light pipe such that an input light ray to the input surface injected parallel to the longitudinal axis is output from the output surface as an output light ray non-parallel to the input light ray.

In an optional embodiment, an angle between the input light ray and the output light ray is an optical angle of deviation of the light pipe, the optical angle of deviation being other than zero degrees. In another optional embodiment, an angle between the longitudinal axis and an output surface normal is a mechanical angle of deviation of the light pipe, the mechanical angle of deviation being other than zero degrees, the output surface normal being normal to the output surface of the second optical structure.

In another optional embodiment, at least the first and second optical structures define an optical path of light through the light pipe, the optical path defined at least in part by the light: coupling-in via the input surface, traversing the first optical structure, refracting from the first to the second optical structures via the interface from the second to the third surfaces, traversing the second optical structure, and coupling out of the second optical structure via the output surface. In another optional embodiment, at least one outer sidewall of the first and second optical structures is coated with a reflective coating, the reflective coating constraining the optical path within the light pipe.

In another optional embodiment, an anti-reflective coating is added to at least one surface of the at least first and second optical structures. In another optional embodiment, the second surface adjoins the third surface. In another optional embodiment, the second surface is separated from the third surface by a gap. In another optional embodiment, the gap filled with a material selected from the group consisting of: air, optical cement, and optical gel. In another optional embodiment, the third surface is configured at a gap angle relative to the second surface.

In another optional embodiment, the first optical structure has a first width and the second optical structure has a fifth width, the fifth width, greater than the first width. In another optional embodiment, a third width of the first optical structure and/or a fourth width of the second optical structure varies along the longitudinal axis of the light pipe. In another optional embodiment, the output surface is at an eighth angle and/or the input surface is at an eleventh angle relative to the longitudinal axis of the light pipe.

In another optional embodiment, further including a light source providing input light to the input surface of the light pipe. In another optional embodiment, further including projecting optics, the light pipe configured to provide the output ray as an input to the projecting optics.

In another optional embodiment, the long dimension of the light pipe is at least an order of magnitude larger than the light pipe width.

According to the teachings of the present embodiment there is provided an apparatus including: a light pipe including at least: a first optical structure having a first refractive index, an input surface at a proximal end of the lightpipe, and a second surface, and a second optical structure having the first refractive index, a third surface, and an output surface at a distal end of the lightpipe, the light pipe having a longitudinal axis parallel to a long dimension of the first optical structure in a direction between the input surface, and the second surface, and an interface between the second surface and the third surface being oblique to the longitudinal axis of the light pipe such that an input light ray to the input surface injected parallel to the longitudinal axis is output from the output surface as an output light ray non-parallel to the input light ray, wherein the second surface is separated from the third surface by a gap.

BRIEF DESCRIPTION OF FIGURES

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 3, a sketch of a light pipe corresponding to FIG. 2B.

FIG. 4, a sketch of a light pipe, similar to the light pipe of FIG. 3.

FIG. 5, a sketch of a light pipe similar to the light pipe of FIG. 4.

FIG. 7, a sketch of the light pipe according to the embodiment of FIG. 6.

FIG. 9, a sketch of a light pipe in which the outer sidewalls are tapered.

FIG. 10, a sketch of a light pipe with structures separated by an air gap.

FIG. 11, a light pipe with the distance between the outer sidewalls constant.

FIG. 12, a light pipe with the distance between the outer sidewalls increasing.

FIG. 13A, a sketch of a light pipe constructed from a single base optical structure.

FIG. 13B, a sketch of the light pie of FIG. 13A, with the light in at a different angle.

FIG. 13C, a sketch of a light pipe including a variation of FIG. 13A and FIG. 13B.

FIG. 13D, a sketch of the light pipe of FIG. 13C showing coupling-in loss.

FIG. 13E, a sketch of the light pipe of FIG. 13C and FIG. 13D with TIR FIG. 13F, a sketch of a light pipe that is a variation of FIG. 13C.

FIG. 13G, a sketch of a variation of in FIG. 13C.

FIG. 13H, a sketch of a variation of FIG. 13G.

FIG. 13I, a sketch of a variation of FIG. 13A and FIG. 13G.

FIG. 14A, a sketch of an alternative implementation of a light pipe.

FIG. 14B, a sketch of a variation of FIG. 14A.

FIG. 14C is a sketch of a variation of FIG. 13C, FIG. 13E, and FIG. 13G, in which the diffuser is placed at the output of the additional optical structure.

FIG. 15B, a sketch of a top view of the light pipe of FIG. 15A.

FIG. 16B, a sketch of an improved light pipe.

FIG. 16C, a sketch of FIG. 16B, in three-dimensions (3D) and with alternative tilt and rotation of the input and output surfaces.

DETAILED DESCRIPTION—FIRST EMBODIMENT—FIGS. 1 to 16C

Figure 1:
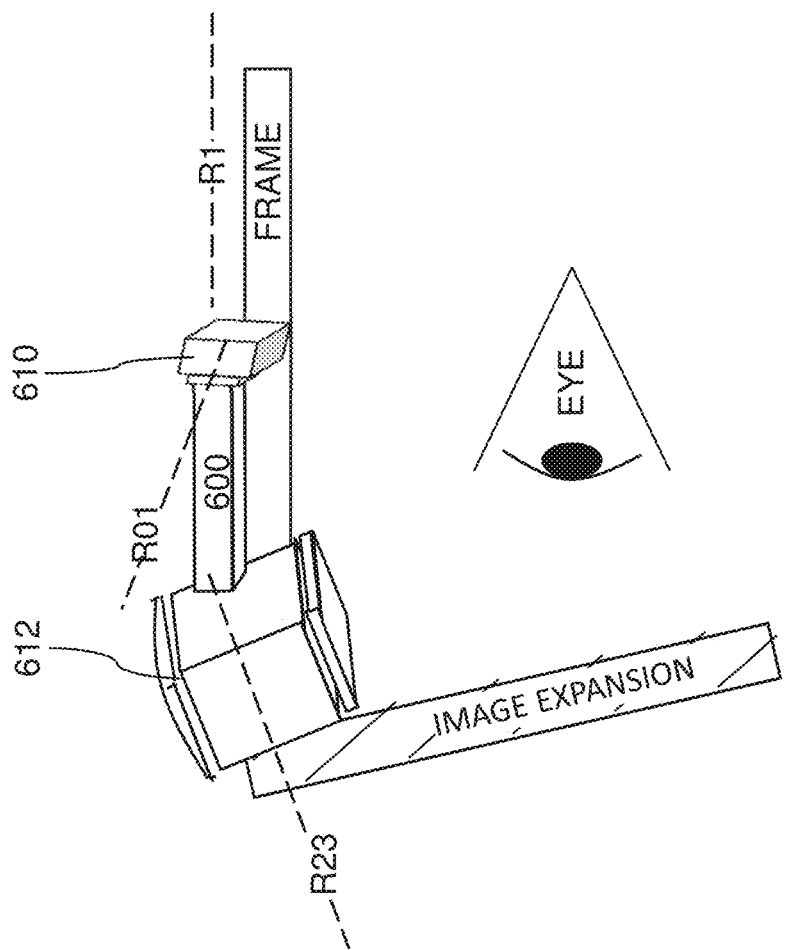
FIG. 1, a sketch of an exemplary typical use.

Embodiments of the present invention are directed to light pipes which provide an optical path that can be folded at any desired folding angle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Note that for simplicity in the figures, only one light ray is generally depicted. The light ray can also be referred to as "light" or a "beam". One skilled in the art will realize that the depicted light (ray) is a sample beam of the actual light, which typically is formed by multiple beams, at slightly differing angles. Except where specifically referred to as an extremity (edge) of the light, the rays illustrated are typically a centroid of the light. In a case wherein the light corresponds to an image and the central ray is a center ray from a center of the image or a central pixel of the image. In a case wherein the light is coming from a light source, the central ray is typically the center (and maximum intensity) of a cone of illumination propagating from the light source.

The illumination light pipe according to embodiments of the present invention is formed from a combination of at least two (i.e., two or more) optical structures (e.g., prisms), namely a first optical structure and a second optical structure. The first optical structure is formed from a material having a first index of refraction, and the second optical structure is formed from a material having a second index of refraction different from the first index of refraction. Light refracts inside the light pipe between the (at least) two optical structures in accordance with Snell's law. Accordingly, the optical path of the light pipe is bent before the light exits the optical structures, thereby allowing higher degrees of freedom for the selection of the folding angle (defined below). By optimizing various parameters of the light pipe, a desired output optical axis angle (i.e., folding angle) can be achieved that suits the desired optical engine envelope. The optimizable parameters include, for example, the refractive indices of the optical structures, the angle(s) of the internal optical junction(s), the orientation angles of the external surfaces of the optical structures, and the orientation angles of the entrance and exit surfaces of the optical structures.

The following paragraphs describe different embodiments of the light pipe of the present invention. The following embodiments are exemplary only, and the invention should not be limited to the particular embodiments described herein. Other embodiments of the light pipe are contemplated as well.

Refer now to FIG. 1, a sketch of an exemplary typical use of an embodiment of a light pipe 600 of the current invention. For aesthetic reasons, the lightpipe 600 is preferably aligned (parallel) to a frame (FRAME) of glasses, shown in the current figure as a longitudinal axis R1 of the lightpipe 600 parallel to the frame. A light source beam from a light source 610 provides input light to the light pipe 600, in this case to an input surface (not shown) along an input surface normal R01. The light pipe diverts the optical axis, changing the direction of the optical path through the lightpipe 600 such that an output light ray along an output surface normal R23 is non-parallel to the input ray along the input surface normal R01. In this case, the illumination output of the light pipe 600 is directed to projecting optics 612, that feeds an image to an image expansion module for viewing by a user's eyes. In the context of this document, the light pipe diverting the optical axis is sometimes referred to as "folding" the optical axis.

Figure 2B:
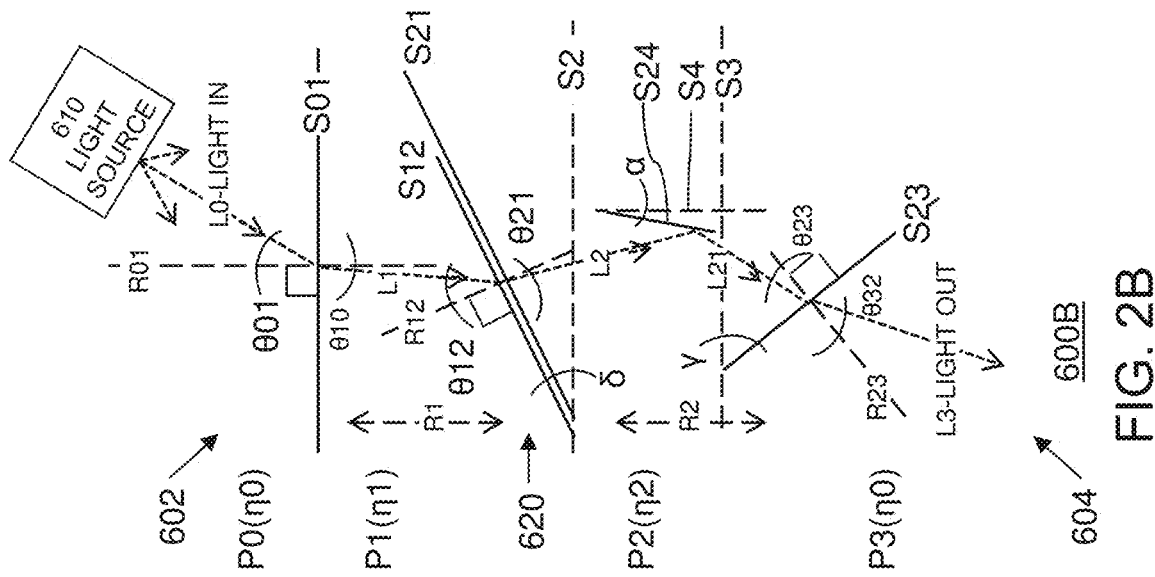
FIG. 2B, a variation of the embodiment illustrated in FIG. 2A.
Figure 2A:
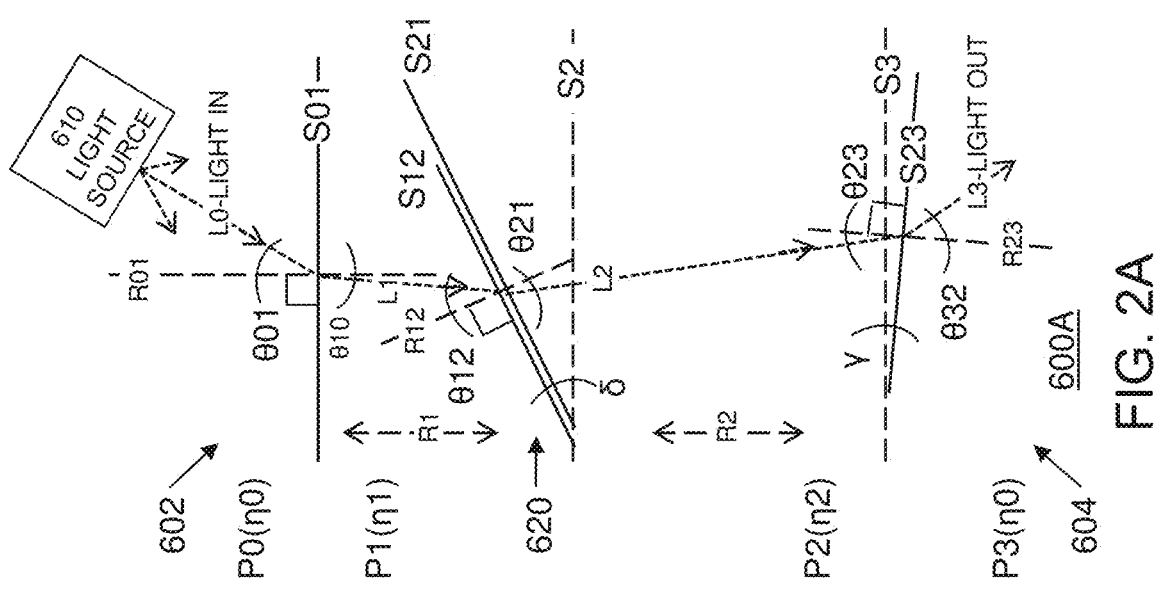
FIG. 2A, a representation of the refraction of the optical path.

With reference to FIG. 2A, a representation of the refraction of the optical path of a light pipe according to an embodiment of the present invention in which two optical structures are used. For clarity, the external sides of the light pipe are not shown. A light pipe 600A has an input end 602 deployed in a first base medium P0 (e.g., air) having a base refractive index $\eta_0$. In the figures, general references are to a light pipe as element 600, and specific embodiments as elements 600x, where "x" is a letter. It will be obvious to one skilled in the art that some descriptions of specific embodiments 600x are applicable to the general light pipe 600 and other specific embodiments 600x. A first optical structure P1 (for example, a component or element, such as a prism) has a first refractive index of $\eta_1$ and a second optical structure P2 (component, element) has a second refractive index of $\eta_2$. The medium at an output end 604 of the light pipe 600 is generally the same medium as at the input end 602 of the light pipe 600. This implementation is not limiting, and the output end 604 can be in a second medium P3, other than the first base medium P0. For clarity in this description, the medium at the output end 604 of the light pipe 100 is generally shown as the second medium P3. In a case where the second medium P3 has refractive index different from the first medium's P0 base refractive index $\eta_0$, the second medium P3 index of refraction is referred to as a third refractive index $\eta_3$. In the current example, the second medium P3 has the base refractive index $\eta_0$, the same refractive index and the same medium as the base medium P0. In the current example, the refractive indices of the first P1 and second P2 optical structures are different. This implementation is not limiting, and as described below, in alternative configurations, the refractive indices of the optical structures can be substantially equal.

A light source 610 provides light to the light pipe 600A. Light sources are known in the art, for example, a group of multiple LEDs where each LED radiates one color of light, the combination of colors being the light provided by the light source. A typical exemplary source provides a combination of colors from three LEDs, one LED producing red light, one LED producing green light, and one LED producing blue light. The light source 610 provides light in that is represented as input light ray L0 (also referred to as a "beam" or "input beam"). The combination of colors, also known as light source channels, are mixed by the light pipe to produce an illumination output, typically substantially white light.

As the base medium P0 and the first optical structure P1 have different indices of refraction, the input ray L0 will be refracted at an external input surface S01 to ray L1 (first optical structure P1 ray L1) internal to the first optical structure P1. The external input surface S01 of the first optical structure P1 of the light pipe 600A has a normal shown as dashed line input surface normal R01 in the direction of the base medium P0. Correspondingly, the input surface normal R01 is also normal to the first optical structure P1 internal side of the input surface S01, the internal side opposite the external side of the input surface S01. A first angle, external input angle $\theta_{01}$ is defined between the input ray L0 and the input surface normal R01. Similarly, a second angle is an internal input angle $\theta_{10}$ is defined between the ray L1 and the input surface normal R01.

The ray L1 propagates from the external input surface S01 via the first optical structure P1 to a second surface S12. In this case, the second surface S12 is an output surface of the first optical structure P1 in a direction of the second optical structure P2. The second surface S12 adjoins a third surface S21 that is an input surface to the second optical structure P2. Typically, the second surface S12 and the third surface S21 are configured adjacent and in contact with each other, effectively implementing a single interface 620 between the first optical structure P1 and the second optical structure P2. For convenience in the current description, the interface 620 of the second surface S12 and the third surface S21 is generally referred to simply as the "second surface S12". Note, in the current figure, the second surface S12 and the third surface S21 are each represented by lines that are slightly separated in the drawing for clarity (instead of using a single line that is the practical implementation of the current example). This implementation is not limiting, and described below are implementations where surfaces of optical structures are not adjacent.

As the first optical structure P1 and the second optical structure P2 have different indices of refraction, the ray L1 will be refracted at the second surface S12 to ray L2 (second optical structure P2 ray L2) internal to the second optical structure P2. The second surface S12 of the first optical structure P1 has a normal shown as dashed line second surface normal R12 in the direction of the first optical structure P1. Correspondingly, the second surface normal R12 is also normal to the second optical structure P2 internal side of the third surface S21. A third angle, second surface output angle $\theta_{12}$ is defined between the ray L1 and the second surface normal R12. Similarly, a fourth angle is a third surface input angle $\theta_{21}$ is defined between the ray L2 and the second surface normal R12.

The ray L2 propagates from the third surface S21 via the second optical structure P2 to an output surface S23. In this case, the output surface S23 is a fourth surface of the second optical structure P2 in a direction of the second medium P3. As the second optical structure P2 and the second medium P3 have different indices of refraction, the ray L2 will be refracted at the output surface S23 to ray L3 (second medium P3 ray L3) internal to the second medium P3. Ray L3 is the light out of the light pipe 600. The output surface S23 of the second optical structure P2 has an output normal shown as dashed line output surface normal R23 (also referred to in the context of this document as a fourth surface normal) in the direction of the second optical structure P2. Correspondingly, the output surface normal R23 is also normal to the second medium P3 external side of the output surface S23. A fifth angle, fourth surface output angle $\theta_{23}$ is defined between the ray L2 and the output surface normal R23. Similarly, a sixth angle is a fourth surface output angle $\theta_{32}$ is defined between the ray L3 and the output surface normal R23.

Two construction lines are used in the current figure. A second reference line S2 and a third reference line S3 both parallel to the input surface S01. The second reference line S2 intersects the second surface S12. A seventh angle ($\delta$, "delta") is defined between the second reference line S2 and the second surface S12 (in this case, also the third surface S21). The seventh angle ($\delta$) is used to help define the orientation of surfaces between the first optical structure P1 and the second optical structure P2. Similarly, the third reference line S3 intersects the output surface S23. An eighth angle (γ, "gamma") is defined between the third reference line S3 and the output surface S23. The eighth angle (γ) is used to help define the orientation of surfaces between the second optical structure P2 and the second medium P3.

An input optical axis is defined as coinciding with the input ray L0, as described above the central ray of the input light. The light rays, in this case the ray L1 and the ray L2 form an optical axis, or optical path, of propagation through the light pipe 600 (through the first P1 and the second P2 optical structures). An output optical axis is defined as coinciding with the output ray L3, the central ray of the output light. References to the "optical path", for example propagation through the light pipe 600, and bending of the optical path, may also be referred to as the "optical axis", for example the optical axis of the light propagating through the light pipe 600 and bending of the optical axis. One skilled in the art will understand that an input ray that is off axis (non-normal to the input surface S01, non-parallel to the input surface normal R01) will normally be reflected several times on the light pipe 600 walls. An exemplary off-axis optical path L9 is shown in the current figure.

In the current embodiment, the optical path is (optical axes are) refracted at least three times. First, the input optical axis (ray L0) of the optical path is refracted from the first medium P0 having refractive index $\eta_0$ to the first optical structure P1 having a refractive index of $\eta_1$. Then the optical path is refracted from the first optical structure P1 having a refractive index of $\eta_1$ to the second optical structure P2 having a refractive index of $\eta_2$. Then the optical path is refracted from the second optical structure P2 having a refractive index of $\eta_2$ to the second medium P3 having refractive index $\eta_0$.

The angles of incidence and angles of refraction are as follows:

$$\eta_0 * \sin(\theta_{01}) = \eta_1 * \sin(\theta_{10})$$

$$\eta_1 * \sin(\theta_{12}) = \eta_2 * \sin(\theta_{21})$$

$$\eta_2 * \sin(\theta_{23}) = \eta_0 * \sin(\theta_{32})$$

$$\theta_{12} = \theta_{10} - \delta$$

$$\theta_{23} = \theta_{21} - (\delta - \gamma)$$

In addition, the two refractive indices $\eta_1$ to $\eta_2$ are both larger than the refractive index of the base medium $\eta_0$. Respectively the first refractive index $\eta_1$ and the second refractive index $\eta_2$ are larger than the base refractive index $\eta_0$. As such, either $\eta_1 \geq \eta_2 \geq \eta_0$, or $\eta_2 \geq \eta_1 \geq \eta_0$.

Given the above discussion and using the current exemplary embodiment, we can now discuss a definition of a folding angle of the light pipe 600. In the context of this document, the term "angle of deviation" (or "folding angle") can be defined with respect to the light, that is, from the "light's point of view" (an "optical angle of deviation" or "optical folding angle"), or relative to the direction of the input optical axis (light input ray L0) and the output optical axis (light output ray L3) (a "mechanical angle of deviation" or "mechanical folding angle"). Where the terms "angle of deviation" or "folding angle" are used without specifying optical or mechanical, one skilled in the art will understand that reference includes both optical and mechanical. In this case, the optical folding angle of the light pipe 600 is an angle defined between the input light ray L0 and the output light ray L3. As discussed above, by choosing, configuring, and optimizing various parameters of the light pipe 600, a desired folding angle can be achieved that suits the desired optical engine envelope. Examples of the parameters include, the refractive indices ($\eta_0$, $\eta_1$, $\eta_2$, $\eta_3$) of the optical structures (P0, P1, P2, P3), the angle(s) of the internal optical junction(s) (δ), the orientation angles (α, β) of the external surfaces of the optical structures, and the orientation angles of the entrance and exit surfaces of the optical structures (ψ, γ). Note, element notation in the previous sentence not yet described, is described below.

Based on the current description, given a desired direction of the output ray L3, the folding angle can be determined, and a light pipe 600 designed for any folding angle, including zero degrees (0°) and 90°, and in particular other than zero degrees (0°) and 90°, that is, with an output optical axis other than straight and normal to the input optical axis.

FIG. 2B shows a variation of the embodiment illustrated in FIG. 2A. Optionally, the outer sidewalls (also referred to in the context of this document as "outer walls") can be coated with a reflective coating layer. In the current embodiment, a first outer sidewall S24 of the light pipe 600B can be coated with a reflective coating layer such that the optical path (in this case ray L2) is additionally reflected at a specific angle (a ninth angle, α, "alpha") inside the light pipe 600B by the first outer sidewall S24 to a ray L21. Alternatively, or in addition, the light pipe 600 can be configured so the outer sidewalls (in this case the first outer sidewall S24) use total internal reflection (TIR) to reflect one or more portions of the optical path. A fourth reference line S4 is a construction line perpendicular to the input surface S01. The fourth reference line S4 intersects the first outer sidewall S24. The ninth angle (α) is defined between the fourth reference line S4 and the first outer sidewall S24. The ninth angle (α) is used to help define the orientation of the first outer sidewall S24 with respect to the other surfaces of the light pipe 600. In the current embodiment, the angle of incidence $\theta_{23}$ of the ray L21 before returning the base medium is given by the equation $\theta_{23} = \theta_{21} - (\delta - \gamma) - 2\alpha$.

FIG. 3 is a sketch of a light pipe 600C corresponding to FIG. 2B, whereby the optical path (L0, L1, L2, L21, L3) is refracted due at least in part by the change in refractive indices of the two optical structures (P1, P2), and is reflected by one of the outer sidewalls (the first outer sidewall S24) of the light pipe 600. Note in the current figure that the input light ray L0 is normal to the external input surface S01 the input light ray L0 is parallel to the input surface normal R01, the external input angle $\theta_{01}$ is 90°, and the internal input angle $\theta_{10}$ is 90°. Note also that the output light ray L3 is normal to the output surface S23, the output light ray L3 is parallel to the output surface normal R23, the fourth surface output angle $\theta_{23}$ is 90°, and the external output angle $\theta_{32}$ is 90°.

In the above description, the folding angle was defined with respect to the light, that is from the "light's point of view" or relative to the direction of the light input ray L0 and the light output ray L3. Alternatively, the folding angle can be described with respect to the mechanical configuration of the elements of the light pipe 600. A longitudinal axis R1 is defined parallel to a long dimension 606 of the first optical structure P1. Note, the longitudinal axis R1 is not restricted to being normal to the input surface S01 nor parallel to the input light ray L0. In the current example, the longitudinal axis R1 is normal to the input surface S01 and is parallel to the input light ray L0. In the examples of FIG. 2A and FIG. 2B the longitudinal axis R1 is may or may not be normal to the input surface S01, and is not parallel to the input light ray L0. The longitudinal axis R1 serves as an input reference for the folding angle. The output surface normal R23 serves as an output reference for the folding angle. The mechanical folding angle is then defined by an angle between the longitudinal axis R1 and the output surface normal R23.

In the figures, the input surface S01 is generally drawn perpendicular to the longitudinal axis R1 of the first optical structure P1, however, this implementation is not limiting, and as described elsewhere the input surface S01 can be non-perpendicular (slanted at an angle other than 90°, or oblique) to the longitudinal axis R1 of the first optical structure P1.

The second optical structure P2 is typically in line with the first optical structure P1, so a second longitudinal axis R2 of the second optical structure P2 is typically the same, parallel, or substantially in the same direction as the first longitudinal axis R1 of the first optical structure P1. This implementation is not limiting, and one skilled in the art will understand that the second longitudinal axis R2 of the second optical structure P2 can be in a direction other than the direction of the first longitudinal axis R1. In the current description, to assist with clearly defining an overall effect of the light pipe 600, the output of the second optical structure P2 is defined relative to the first optical structure P1, (and the first longitudinal axis R1). Note that in the figures, for simplicity the optical structure surfaces (for example, the input surface S01, the first outer sidewall S24, and the output surface S23) are generally drawn as flat surfaces (straight lines), however, this implementation is not limiting, and surfaces of the optical structures can be other shapes, such as curved. For example, the input surface S01, the second surface S12, and/or the output surface S23 can be curved, thus implementing a lens at the respective input and output of the light pipe.

While the output surface S23 can be a variety of shapes, for ease of manufacturing and mechanical attachment to follow-on devices, a straight surface that is also perpendicular to sides of the light pipe 600 is often preferred.

In the figures, a first width W1 of the first optical structure P1 is generally drawn substantially equal to a second width W2 of the second optical structure P2. Widths of the optical structures are not necessarily equal, as some of the below described examples detail. Widths of the optical structures are generally along a short axis of the light pipe 600 as compared to a long axis (such as the longitudinal axis R1) of the light pipe 600, in other words, typically perpendicular to the longitudinal axis R1.

FIG. 4 is a sketch of a light pipe 600D, similar to the light pipe 600C of FIG. 3. In the current figure, the optical path, ray L1, undergoes an additional reflection 640 by Fresnel reflection internal to the first optical structure P1 at the second surface S12, reflecting a ray L12 toward a fourth outer sidewall S15 of the light pipe 600D. A second additional reflection 642 (by total internal reflection) at the fourth outer sidewall S15 reflects a ray L13 toward the second surface S12. The ray L13 refracts from the first optical component P1 to the second optical component P2, continuing along the light path as described above.

FIG. 5 is a sketch of a light pipe 600E according to another embodiment, similar to the light pipe 600D of FIG. 4. In the current embodiment, the optical structures are implemented as two prisms constructed from the same material and separated by a gap 650, in this case an air gap. In this case, the interface 620 includes the area of the second surface S12, the third surface S21, and the gap 650. A first prism is the first optical structure P1 having the first refractive index of $\eta_1$ and a second prism P11 is an other optical structure having the first refractive index of $\eta_1$. As described above, this exemplary implementation is not limiting, and two or more optical structures can be used. Two or more of the optical structures can have different refractive indices, or two or more of the optical structures can have the same refractive indices. Outer sidewalls are designated for the second optical structure P2 as the first outer sidewall S24, a second outer sidewall S25, and designated for the first optical structure P1 as a third outer sidewall S14 and a fourth outer sidewall S15. The angle and spacing of the (air) gap 650 with respect to the outer sidewalls (S14, S15, S24, S25) of the prisms (P1, P11) and an angle of the optical structure surfaces (the second surface S12 and the third surface S21, for example, can be parallel or non-parallel to each other) is determined such that the whole range of useful rays propagating inside the light pipe (between rays 652) are reflected at the air gap by total internal reflection, then reflection off of the fourth outer sidewall S15 (by total internal reflection), are again incident at the air gap at angles less than the critical angle and are thereby transmitted from the first prism P1 via the air gap 650 to the second prism P11. As a result, the beam (between rays 652) is narrowed (range between beams 654) and diverted. In the event that there are reflections off of the first prism P1 upper fourth outer sidewall S15, following reflection at the air gap 650, are incident below the critical angle to prevent transmission at the air gap 650, a mirror (e.g., a reflective coating or a reflective surface) may be applied to the region of the upper fourth outer sidewall S15 at which reflection occurs.

Figure 6:
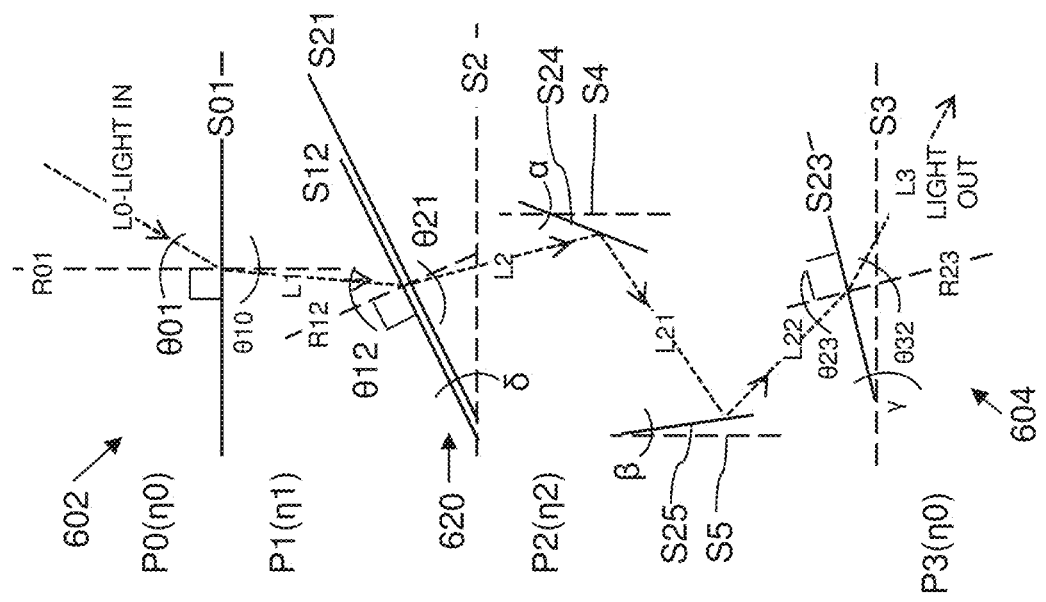
FIG. 6, a variation of the embodiment illustrated in FIG. 2B.

FIG. 6 shows a variation of the embodiment illustrated in FIG. 2B with additional components illustrated in FIG. 7 where there are two internal reflections of the principal ray (light path L0, L1, L2, L21, L22, L3). In the current embodiment, in the second optical structure P2 the first outer sidewall S24 of the light pipe 600F can be coated with a reflective coating layer such that the optical path (in this case ray L2) is additionally reflected at a specific angle (a ninth angle, $\alpha$, "alpha") inside the light pipe 600F by the first outer sidewall S24 to a ray L21. Similarly, the second outer sidewall S25 of the light pipe 600F can be coated with a reflective coating layer such that the optical path (in this case ray L21) is additionally reflected at a specific angle (a tenth angle, $\beta$) inside the light pipe 600F by the second outer sidewall S25 to a ray L22. Alternatively, or in addition, the light pipe 600 can be configured so the outer sidewalls (in this case the first outer sidewall S24 and the second outer sidewall S25) use total internal reflection (TIR) to reflect one or more portions of the optical path A fifth reference line S5 is a construction line perpendicular to the input surface S01. The fifth reference line S5 intersects the second outer sidewall S25. The tenth angle ($\beta$) is defined between the fifth reference line S5 and the second outer sidewall S25. The tenth angle ($\beta$) is used to help define the orientation of the second outer sidewall S25 with respect to the other surfaces of the light pipe 600. In this embodiment, the angle of incidence $\theta_{23}$ of the optical axis before returning the second medium P3 is given by the equation $\theta_{23} = \theta_{21} - (\delta - \gamma) - 2*\alpha - 2*\beta$.

FIG. 7 is a sketch of the light pipe 600F according to the embodiment of FIG. 6. For clarity, not all of the elements of FIG. 6 are shown. In the current figure, the sidewalls (S24, S25) of the second optical structure P2 are parallel to each other and perpendicular to the input surface S01. Thus, the fourth reference line S4 is parallel, coinciding with the first outer sidewall S24 and the ninth angle ($\alpha$) is zero (0°). Similarly, the fifth reference line S5 is parallel, coinciding with the second outer sidewall S25 and the tenth angle ($\beta$) is zero (0°).

Figure 8:
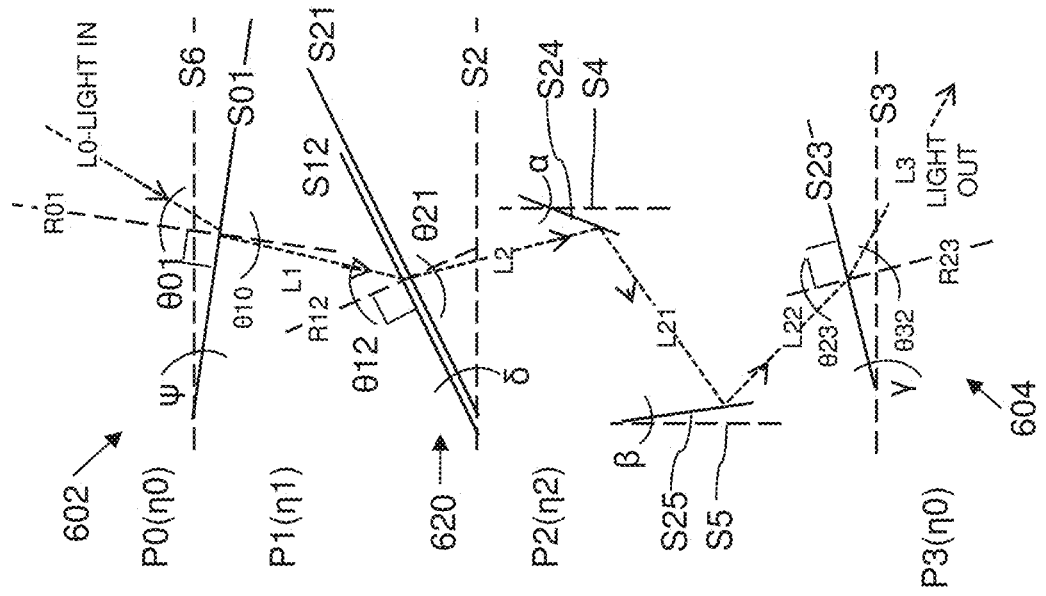
FIG. 8, a representation of a variation of the embodiment illustrated in FIG. 9.

FIG. 8 shows a representation of a variation of the embodiment illustrated in FIG. 9, further including the input surface S01 is angled. In combination with any of the above-described embodiments, the light pipe 600 can be angled such that the entrance surface, the external input surface S01 (i.e., the interface between the base medium P0 and the first optical structure P1) is tilted at a specific angle (an eleventh angle, ψ, "psi"). Note that representation shown in FIG. 8 is the representation shown in FIG. 6 with an additional tilt angle ψ. A tilt angle can be applied to other representations as well, such as FIG. 2B. Similar to the above descriptions, A sixth reference line S6 is a construction line, now used as a reference in place of the input surface S01, as the input surface S01 is now tilted. The sixth reference line S6 intersects the input surface S01. The eleventh angle (ψ) is defined between the sixth reference line S6 and the input surface S01. The eleventh angle (ψ) is used to help define the orientation of the input surface S01 with respect to the other surfaces of the light pipe 600G.

FIG. 9 is a sketch of a light pipe 600G according to another embodiment of the present invention in which the outer sidewalls of the light pipe (i.e., the outer sidewalls of the two optical structures) are tapered, resulting in a light pipe with tapered sidewalls. The first optical structure P1 has the first width W1 at the input end 602 which in the current figure is also the width of the input surface S01. The first optical structure P1 increases in width along the longitudinal axis R1 in the direction of the optical path (ray L1) to a third width W11 near the second surface S12. The second optical structure P2 has a fourth width W22 near the third surface S21. The second optical structure P2 decreases in width along the longitudinal axis R1 in the direction of the optical path (L2, L21, L22), from the second surface S12 toward the output surface S23, to the second width W2 near the output surface S23. Alternatively, (not shown in the current figure) the first optical structure P1 can decrease or remain constant in width and the second optical structure P2 can increase or remain constant in width along the longitudinal axis R1.

In the current figure the ninth angle (α) and the fourth reference line S4 for the first outer sidewall S24 are shown, as well as the tenth angle (β) and the fifth reference line S5 for the second outer sidewall S25. The corresponding reference lines and angles are not shown for the third outer sidewall S14 and the fourth outer sidewall S15. Based on this description, one skilled in the art will be able to handle these elements appropriately.

FIG. 10 is a sketch of a light pipe 600I in which different structures (parts) of the light pipe, with equal junction surface angle, are separated by an air gap 660. The optical structures, in the current exemplary figure are two structures (P1, P2) that can have the same or different refractive indices. The current figure is similar to FIG. 5. In the current exemplary figure, the second surface S12 and the third surface S21 are at a gap angle 1000 to each other, as compared to the exemplary embodiment of FIG. 5 where the second surface S12 and the third surface S21 are parallel to each other. In this case, the interface 620 includes the area of the second surface S12, the third surface S21, and the gap 660. While the second surface S12 is perpendicular to the longitudinal axis R1 (and parallel to the input surface S01), the third surface S21 is oblique to the longitudinal axis R1, and thus the interface 620 is considered oblique to the longitudinal axis R1 of the light pipe 600.

FIG. 11 and FIG. 12 are sketches of light pipes (600J, 600K) in which different optical structures (P1, P2) are separated by a gap 670 optionally filled with an optical medium 672 having a corresponding gap refractive index $\eta_4$.

In this case, the interface 620 includes the area of the second surface S12, the third surface S21, the gap 670, and the optical medium 672. Optical mediums include, for example, as optical cement and optical gel. At least two different refractive indices should be used for the three structures [the first optical structure P1($\eta_1$), the second optical structure P2($\eta_2$), the gap 670 ($\eta_4$)] so the optical path is refracted along the longitudinal axis R1. While the current figure is drawn with the gap 670 being between parallel surfaces, in this case the second surface S12 and the third surface S21, this implementation is not limiting, and the gap 670 can include gap angle 1000 as described in reference to FIG. 10. In implementations in which the separation is by an optical medium, in order to improve efficiency, the distance (width) between the outer sidewalls of the light pipe can be increased (i.e., widen the light pipe) at the section of the light pipe after the interface 620 of two different refractive indices. In this case, widening the second optical structure P2. Optionally, one or more anti-reflective coatings can be added between the different optical structures, for example, to improve efficiency of light transmission from the first P1 to second P2 optical components.

FIG. 11 shows a light pipe 600J in which the distance between the outer sidewalls remains constant—in this case resulting in light loss, i.e., reduced efficiency. In the current figure, the first width W1 of the first optical structure P1 is substantially equal to the second width W2 of the second optical structure P2. A portion of output rays L33 are in a band W33 that will not exit the light pipe 600J together with the rest of the beam (the output light rays L3), but will rather have an additional reflection off of the upper surface (the first outer sidewall S24), and will be lost to the system (not output within a useable range of output angles from the output surface S23).

FIG. 12 shows a light pipe 600K in which the distance between the outer sidewalls (the first outer sidewall S24 and the second outer sidewall S25), in the section after the interface 620 (after the gap 670, the second optical structure P2), is increased from the second width W2 to a fifth width W23—thereby preserving efficiency as can be seen by all of the output rays L31 being output from the output surface S23. In this case, the fifth width W23 is greater than the second width W2. The result is the light pipe 600K having a second section (corresponding to the second optical structure P2, i.e., prism) that is wider than a first section (corresponding to the first optical structure P1, i.e., prism).

FIG. 13A is a sketch of a light pipe 1300A constructed from a single base optical structure 1310 formed as a slab-type structure having slanted entrance 1302 and exit 1304 surfaces. The optical structure 1310 can be formed by taking a rectangular slab and making corresponding diagonal cuts at the ends of the slab. The resultant light pipe 1300A has a trapezoidal shape in the cross-section of the plane of the paper. When implemented as an isosceles trapezoid, the angle of incidence of input light L0 entering the light pipe 1300A through the entrance surface 1302, and the angle of the light coupled out L4 of the light pipe 1300A through the exit surface 1304, are equal.

FIG. 13B is a sketch of the light pie 1300A of FIG. 13A, with the light in L0 at a different angle relative to the entrance surface 1302. Although the light pipe 1300A shown in FIG. 13A has the advantage of being formed from a single structure (base 1310), the light pipe 1300A may suffer from coupling-out light loss, i.e., reduced efficiency as shown by output light L5 coupling out from an outer wall of the light pipe 1300A, not coupling out from the output surface 1304.

FIG. 13C is a sketch of a light pipe 1300B including a variation of the embodiment illustrated in FIG. 13A and FIG. 13B. The current embodiment, lightpipe 1300B, avoids coupling-out light L5 loss, thereby preserving efficiency. In this embodiment, an additional optical structure 1312, in the form of a coupling-out wedge (e.g., prism), is attached to the single base optical structure 1310. In this case, the previous exit surface 1304 of the single optical structure can be replaced by forming an exit surface 1306 of the single base optical structure 1310 by making a vertical cut at the right end (non-limiting directional reference as drawn on the sheet) of the single base optical structure 1310 resulting in a right trapezoid in the cross-section of the plane of the paper. The two optical structures (1310, 1312) may have different refractive indices, or may have the same refractive indices so as to prevent unwanted reflections/refractions at the junction surface (i.e., interface 620) between the two optical structures (1310, 1312). The lightpipe 1300B now has a new output surface 1308 from the additional optical structure 1312.

FIG. 13D is a sketch of the light pipe 1300B of FIG. 13C showing coupling-in loss. Although the current light pipe 1300B avoids coupling-out light loss L5, the light pipe 1300B may be subject to coupling-in light loss L6 due at least in part to a refractive index of the material from which the single base optical structure 1310 is formed. As seen in the current figure, if the refractive index of the single base optical structure 1310 is not high enough, some of the light rays L0 entering the single base optical structure 1310 through the entrance surface 1302 may be refracted at a steep angle, such that, when the refracted light rays strike the bottom surface of the single base optical structure 1310, the refracted light rays may not undergo total internal reflection within the single base optical structure 1310. Therefore, the material(s) from which the two optical structures (1310, 1312) are formed is/are preferably of high enough refractive index (preferably 1.60 and above) such that light rays entering L0 the single base optical structure 1310 through the entrance surface 1302 are refracted at a shallow enough angle so as to undergo total internal reflection (TIR) when striking the bottom surface of the single base optical structure 1310.

FIG. 13E is a sketch of the light pipe 1300B of FIG. 13C and FIG. 13D where the single base optical structure 1310 is made from a material of high enough index of refraction that the input light L0 is refracted at the input surface 1302 at a high enough angle to result in TIR when striking the bottom surface of the single base optical structure 1310.

FIG. 13F is a sketch of a light pipe 1300C that is a variation of the light pipe 1300B of FIG. 13C. In the current figure, an input surface 1302A is "flipped" vertically on the sheet from the input surface 1302, providing the single base optical structure 1310 with an input surface 1302A rotated 90° from the input surface 1302 of the previously described lightpipe 1300B. The functionality of both light pipes (1300B, 1300C) is maintained.

FIG. 13G is a sketch of a variation of the embodiments illustrated in FIG. 13C. The light pipe 1300B is part of an optical apparatus in which a collimating lens 1320 is deployed at or near the entrance surface 1302 of the single base optical structure 1310 (i.e., trapezoidal structure). The use of a collimating lens reduces the angular range of the light source beam L7, reducing coupling-in loss of the input light ray L0 to the lightpipe 600. The collimating lens 1320 may be attached to the entrance surface 1302 via optical cement, or may be deployed near the entrance surface 1302 with an air gap maintained between the collimating lens 1320 and the entrance surface 1302. In embodiments in which an air gap is maintained, the collimating lens 1320 can be held in place via a mechanical arrangement. The light source 610 provides light to the collimating lens 1320 that collimates the provided light and outputs a collimated beam L01 of light to the entrance surface 1302. The current configuration results in a collimated output beam L31.

FIG. 13H is a sketch of a variation of the embodiment illustrated in FIG. 13G. In the current embodiment, a Fresnel lens 1330 is used instead of the collimating lens 1320. The use of the Fresnel lens 1330 has an advantage of providing light rays L01 covering a wider range of angles to the entrance surface of the single base optical structure 1310, as compared to use of the collimating lens 1320. Another advantage of using the Fresnel lens 1330 is mechanical, providing a smaller focal length for the same volume compared to the collimating lens 1320. The Fresnel lens 1330 can be configured in an optical apparatus with the single base optical structure 1310 similar to the above-described deployment of the collimating lens 1320, for example with optical cement or an air gap.

FIG. 13I is a sketch of a variation of the embodiments illustrated in FIG. 13A and FIG. 13G. In the current embodiment, a pyramid 1340 (made for example of glass or plastic) is used instead of the collimating lens 1320. The use of the pyramid 1340 has an advantage of using reflection instead of refraction. The pyramid 1340 collects the light source beam L7, better than the collimating lens 1320, in part because the light source 610 (for example, LEDs) can be brought in contact with the pyramid 1340 entrance. Typically, when using a regular lens, such as the collimating lens 1320, a distance needs to be kept between the light source 610 and the lens surface. For example, the source may need to be at a focal plane of the lens to work properly. As a result, high angle rays are lost from the light source beam L7. Using the pyramid 1340, relatively more high angle rays can be collected from the light source beam L7. In an alternative embodiment, instead of using the pyramid 1340, a reflective lens with a curved (non-straight) side wall can be used. The pyramid 1340 can be configured in an optical apparatus 1300D with the single base optical structure 1310 similar to the above-described deployment of the collimating lens 1320, for example with optical cement or an air gap.

In the current figure, the output of the single base optical structure 1310 is the exit surface 1304 as described above with reference to FIG. 13A. In the current embodiment, a diffuser 1350 is configured adjacent to the exit surface 1304. One exemplary advantage of using a diffuser is for better color mixing. The use of a diffuser at the output of the lightpipes and as a component of the optical apparatus is an optional embodiment.

According to certain embodiments, the optical structures which form the light pipe can be arranged such that the optical axis R01 at the entrance surface/aperture S01 (i.e., the interface between the base medium P0 and the first optical structure P1) is orthogonal to the optical axis R23 at the exit surface/aperture S23 (i.e., the interface between the second optical structure P2 and the base medium P3).

According to certain embodiments, an anti-reflection coating can be applied to the junction surface (i.e., the interface 620, where two surfaces are adjacent, or on a surface adjacent to an air gap) between two optical structures that form the light pipe.

According to certain embodiments, a reflective coating can be applied to some or all of the outer surfaces (outer sidewalls) of the light pipe.

According to certain embodiments, an index matched optical cement or optical gel can be deployed between the two optical structures that form the light pipe. The refractive index of the optical cement or optical gel can be matched to one of the juxtaposed materials from which the optical structures are constructed.

According to certain embodiments, an optical cement or optical gel having a deliberately unmatching refractive index can be deployed between the two optical structures that form the light pipe.

One skilled in the art will understand the typical dimensions and requirements for general light pipe operations. For example, the long dimension (606) of the light pipe (600) is typically referred to as the length of the light pipe 600, and is significantly longer (for example, an order of magnitude larger) than the short dimension (width) of the light pipe. A cross-section of the light pipe 600 is typically rectangular, however, this is not limiting, and other cross-sections can be used, for example, round. A typical thickness of the light pipe 600 is from 1 to 5 mm. A typical length of the light pipe 600 is from 10 to 60 mm.

The light pipe 600 conveys light (the input light ray L0) from the input surface S01 to the output surface S23, preferably with negligible loss of illumination intensity. Embodiments of the current invention change the orientation of the incoming light, the light entering the light pipe 600 with a given aperture and exiting the light pipe 600 with a substantially similar aperture. The optical path of the light is redirected, a deviation of the optical path through the light pipe 600.

The range of angles of the input light can vary. For example, the light in L0 can be at an external input angle $\theta_{01}$ between 0° and +−60° (for simplicity referred to as just +−60°). L0 can be any of the rays of a cone of light originating at the light source 610 and impinging on the external input surface S01. Another non-limiting example, the input light L0 can be non-symmetric around the input surface normal R01, for example between the angles of −30° and +40°. LED sources in current use include possible input of +−90°. Similarly, the light out L3 can be at an output angle $\theta_{32}$ between 0° and +−60° (for simplicity referred to as just +−60°). Another non-limiting example, the light out L3 can be non-symmetric around the output surface normal R23, for example between the angles of −20° and +30°. One preferred implementation is an output range of +−40°. The light pipe 600G of FIG. 9 can be used to change the range of angles of the light out L3. For example, tapering the second optical structure P2 can be used to reduce the range of output angles and/or to concentrate the propagating light rays into an angle of interest. Similarly, if the range of input angles is broader (greater) than a desired range at the output, the second optical structure P2 can be tapered to reduce the output range of angles. Similarly, if the range of input angles is narrower (smaller) than a desired range at the output, the second optical structure P2 can be increased in width (W22 to W2) to increase the output range of angles.

FIG. 14A is a sketch of an alternative implementation of a light pipe. Although the embodiments described thus far have pertained to a light pipe constructed from two main optical structures (e.g., prisms, for example the first optical structure P1 and the second optical structure P2) having indices of refraction that are different from each other, other embodiments are possible in which a single main optical structure (i.e., block, in the current figure the first optical structure P1) is used in conjunction with, for example, an array of microprisms 1360 deployed at the output surface S12 of the block. The current figure illustrates such an embodiment, in which the light pipe remains in a single main block (P1) and the direction of the radiated light L31 at the block output can be adjusted via an array of microprisms 1360 at the block output. The array of microprisms 1360 can be used to change direction of the radiated light L31 to be non-normal to the surface S12. Alternatively, the same or similar functionality can be achieved by deploying a commercially available Direction Turning Films (DTF) at the block output S12.

FIG. 14B is a sketch of a variation of the embodiment illustrated in FIG. 14A. In the current figure, the diffuser 1360 is deployed at the output of the array of microprisms 1360. The diffuser 1350 has the effect of further spreading the light that is output by the microprism array so as to cover a wider range of angles L32, and/or improve color mixing. The diffuser 1350 can be used to achieve a range of angles around a central ray (of the output rays L31), shown as the angles L32.

FIG. 14C is a sketch of a variation of the embodiments illustrated in FIG. 13C, FIG. 13E, and FIG. 13G, in which the diffuser 1350 is placed at the output 1308 of the additional optical structure 1312, i.e., the wedge (prism). Similar to the embodiment described with reference to FIG. 14B, the diffuser 1350 of FIG. 14C spreads the light L32 that is output by the additional optical structure 1312 in order to cover a wider range of angles, and/or improve color mixing.

Figure 15A:
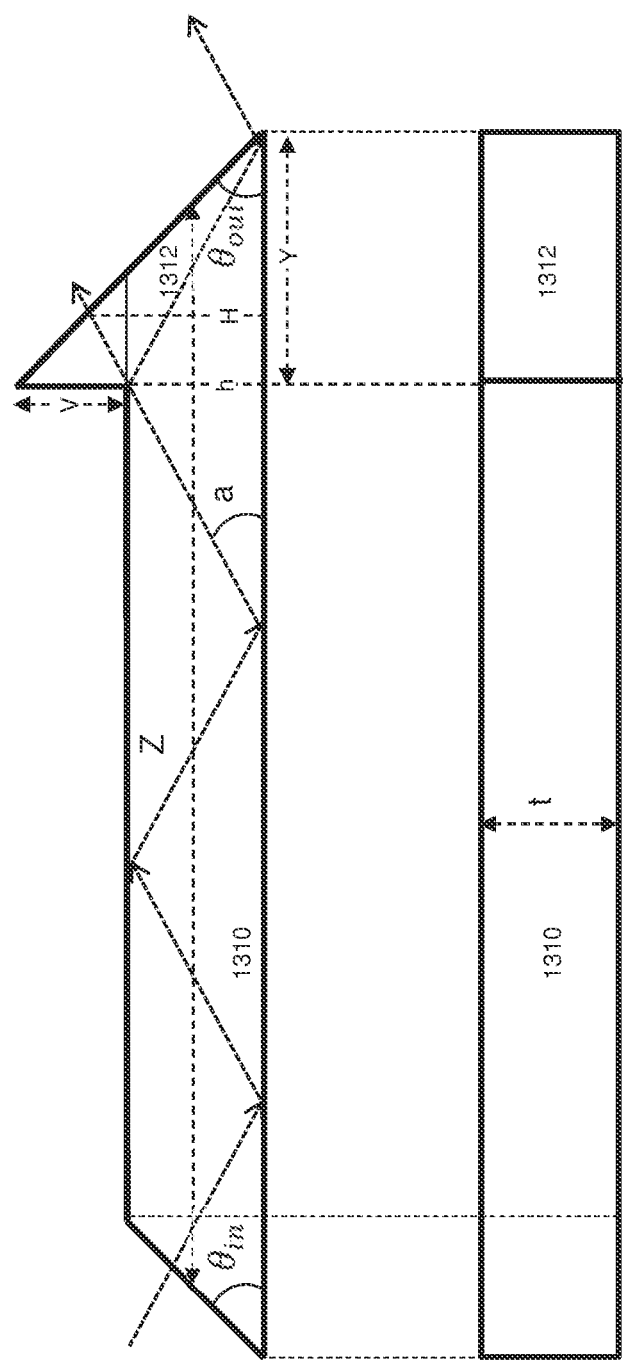
FIG. 15A, a sketch of a side view of the light pipe of FIG. 13C to FIG. 13I.

FIG. 15A is a sketch of a side view of the light pipe of FIG. 13C to FIG. 13I. FIG. 15B is a sketch of a top view of the light pipe of FIG. 15A. The current figures, at least in part, define the dimensions of the outcoupling wedge (additional optical structure 1312) to avoid loss of light from the single base optical structure 1310 to be output from the new output surface 1308. "Y" is the minimum length of the out coupling wedge (along an edge from the single base optical structure to the output surface), "h" is the height of the single base optical structure 1310, "Z" is the length of the lightpipe from the input to output surface, "a" is an angle at which an incoming ray reflects off the side of the lightpipe to intersect where the extension of the wedge meets an other surface of the lightpipe, "H" is the height of the out coupled ray (from the edge of the wedge/additional optical structure 1312 to the output surface), "V" is the height of the wedge beyond the light pipe base optical structure 1310, and "θ" is the angle of the wedge between the output surface and a surface of the base optical structure 1310.

"Y=h tan a Z" is the minimum length of the out coupling wedge (the additional optical structure 1312) to avoid loss of propagating light rays in the lightpipe 1500 by TIR.

"H=h+[V/[1+[tan θ/tan a]]]" where "H" is the minimum height of the out coupling wedge (the additional optical structure 1312).

A typical ratio to allow sufficient color mixing is "5<[Z/h]<10".

Figure 16A:
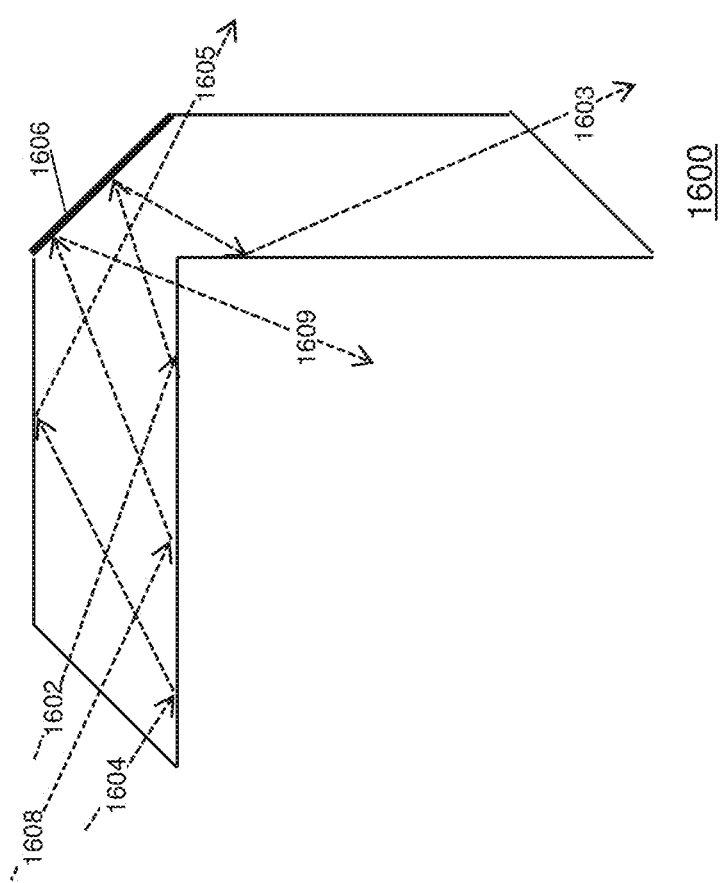
FIG. 16A, a sketch of a conventional folded light pipe using a reflective coating.
Figure 15A:
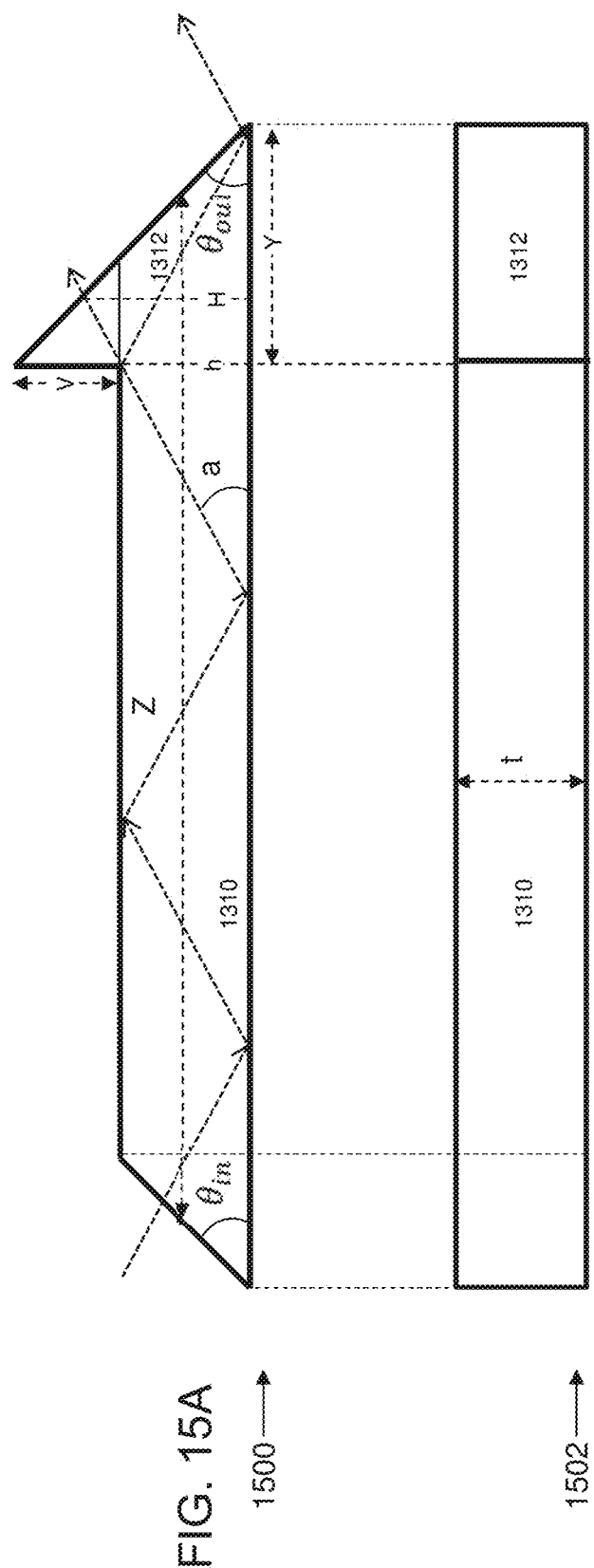

FIG. 16A is a sketch of a conventional folded light pipe 1600 using a reflective coating 1606 (i.e., mirror coating) to achieve re-direction of the light path of input light 1602 to output light 1603. In the current configuration, light can be lost during propagation through the light pipe 1600 via at least two light ray arrangements, for example, input light 1604 couples out as lost output light 1605 and input light 1608 couples out (escapes) as lost output light 1609.

Note, for clarity in the current and next figures, refraction of the light path is not shown.

FIG. 16B is a sketch of an improved light pipe 1610. In the current embodiment, an interface 1620 is configured between the first optical structure P1 and a fourth optical structure P4, and also configured between the fourth optical structure P4 and the second optical structure P2. The fourth optical structure P4 has a mirrored internal surface 1606 configured on a side of the fourth optical structure P4 other than the sides adjoining the first P1 and second P2 optical structures. A typical interface 1620 is using a low index optical cement. This low index interface(s) 1620 allows low angles (with respect to normal of the surface) of propagating light rays to pass through the interface 1620, and high angles of propagating light rays will be reflected by TIR.

The interface 1620 (each interface, shown as exemplary interface 1620A and 1620B) at least in part generates TIR 1616 (shown as respective exemplary TIR 1616A and 1616B) and avoids light loss. In the current figure, the interface 1620 results in TIR at area 1616. The propagating input light 1604 undergoes TIR 1616B at the interface 1620B, the light continues through the second optical structure P2, and exits the output surface of the light pipe 1610 as output light 1615. The propagating input light 1608 undergoes TIR 1616A at the interface 1620A, the light continues through the second optical structure P2, and exits the output surface of the light pipe 1610 as output light 1619. Thus, the two ray arrangements (input light 1604 and 1608) that are lost in a conventional implementation (FIG. 16A, 1605, 1609) are preserved (1615, 1619) using the current embodiment of additional low index interfaces 1620).

In an alternative embodiment, the interface(s) 1620 can be implemented with (an) air gap(s). In the current figure, in a non-limiting implementation, the input surface S01 and output surface S23 are tilted in the opposite direction (for example, orthogonal) relative to the tilt of the mirror 1606. As described above, the tilt of the input surface S01 can be described using the eleventh angle (ψ) and the tilt of the output surface S23 can be described using the eighth angle (γ).

FIG. 16C is a sketch of the improved light pipe 1610 of FIG. 16B, but sketched in three-dimensions (3D) and with alternative tilt and rotation of the input and output surfaces. In the current embodiment of a light pipe 1630, the input surface S01 and output surface S23 are tilted in the same direction (for example, parallel) relative to the tilt of the mirror 1606. As described above, the input S01 and output S23 surfaces can be tilted at any angle relative to the light pipe 600 axis. Preferably, the input S01 and output S23 surfaces are tilted between 0° (zero) and 45°, and most preferably tilted at 45°. The input surfaces can also lack tilt, that is be straight, as described above for example in reference to FIG. 2A light pipe 600A and FIG. 3 light pipe 600C.

In addition, in the current embodiment, the input surface S01 and output surface S23 are rotated. The input surface S01 is rotated, as shown by arrows 1601, relative to the (first) longitudinal axis R1 of the first optical structure P1. Similarly, the output surface S23 is rotated, as shown by arrows 1623, relative to the second longitudinal axis R2 of the second optical structure P2. The input S01 and output S23 surfaces can be rotated at any angle relative to the light pipe 600 axis. Preferably, the input S01 and output S23 surfaces are rotated to increments of 90° (0°, 90°, 180°, 270°).

Based on the current description, one skilled in the art will be able to select and design a refractive index of the interface 1620 (for example, selecting an optical cement with an appropriate refractive index) that is close enough to the refractive indices of the optical structures (P1, P2) to avoid rays being reflected backward (toward the input surface) by TIR, but sufficiently different (far enough) from the refractive indices of the optical structures (P1, P2) to implement sufficient TIR to avoid light escaping from the sides of the light pipe 600.

Note that the rotating described in reference to the current figure's lightpipe 1630 can be applied to all of the above-described light pipes 600.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. An apparatus comprising:
   a light pipe (600) including at least:
   (i) a first optical structure (P1) having a first refractive index ($\eta_1$), an input surface (S01) at a proximal end of said lightpipe (600) through which light from a light source enters said light pipe (600), and a second surface (S12), and
   (ii) a second optical structure (P2) having a second refractive index ($\eta_2$) not equal to said first refractive index, a third surface (S21), and an output surface (S23) at a distal end of said lightpipe (600) through which light exits said light pipe (600),
   said light pipe (600) having a longitudinal axis (R1) parallel to a long dimension (606) of said first optical structure (P1) in a direction between said input surface (S01), and said second surface (S12), and an interface (620) between said second surface (S12) and said third surface (S21) being oblique to said longitudinal axis (R1) of said light pipe (600) such that an input light ray (L0) to said input surface (S01) injected parallel to said longitudinal axis (R1) is output from said output surface (S23) as an output light ray (L3) non-parallel to said input light ray (L0), wherein the light pipe (600) is coupled to a frame of a mechanical body that supports the apparatus on a user's head, wherein the light pipe (600) is aligned with the frame so that the longitudinal axis (R1) of said light pipe (600) is parallel to a direction of elongation of the frame.

2. The apparatus of claim 1 wherein an angle between said input light ray (L0) and said output light ray (L3) is an optical angle of deviation of said light pipe (600), said optical angle of deviation being other than zero degrees (0°).

3. The apparatus of claim 1 wherein an angle between said longitudinal axis (R1) and an output surface normal (R23) is a mechanical angle of deviation of said light pipe (600), said mechanical angle of deviation being other than zero degrees (0°), said output surface normal (R23) being normal to said output surface (S23) of said second optical structure (P2).

4. The apparatus of claim 1 wherein at least said first (P1) and second (P2) optical structures define an optical path of light through said light pipe (600), said optical path defined at least in part by the light:
  (a) coupling-in via said input surface (S01),
  (b) traversing said first optical structure (P1),
  (c) refracting from said first (P1) to said second (P2) optical structures via said interface (620) from second (S12) to said third (S21) surfaces,
  (d) traversing said second optical structure (P2), and
  (e) coupling out of said second optical structure (P2) via said output surface (S23).

5. The apparatus of claim 4 wherein at least one outer sidewall (S14, S15, S24, S25) of said first (P1) and second (P2) optical structures is coated with a reflective coating, said reflective coating constraining said optical path within said light pipe (600).

6. The apparatus of claim 1 wherein an anti-reflective coating is added to at least one surface (S01, S12, S21, S23) of said at least first (P1) and second (P2) optical structures.

7. The apparatus of claim 1 wherein said second surface (S12) adjoins said third surface (S21).

8. The apparatus of claim 1 wherein said second surface (S12) is separated from said third surface (S21) by a gap (660, 670).

9. The apparatus of claim 8 wherein said gap filled with a material selected from the group consisting of:
  (a) air,
  (b) optical cement, and
  (c) optical gel.

10. The apparatus of claim 8 wherein said third surface (S21) is configured at a gap angle (1000) relative to said second surface (S12).

11. The apparatus of claim 8 wherein said first optical structure (P1) has a first width (W1) and said second optical structure (P2) has a fifth width (W23), said fifth width (W23), greater than said first width (W1).

12. The apparatus of claim 1 wherein a third width (W11) of said first optical structure (P1) and/or a fourth width (W22) of said second optical structure (P2) varies along the longitudinal axis (R1) of said light pipe (600).

13. The apparatus of claim 1 wherein said output surface (S23) is at an eighth angle ($\gamma$, "gamma") and/or said input surface (S01) is at an eleventh angle ($\Psi$, "psi") relative to said longitudinal axis (R1) of said light pipe (600).

14. The apparatus of claim 1 further including a light source (610) providing input light (L0, L7) to said input surface (S01) of said light pipe (600).

15. The apparatus of claim 1 further including projecting optics (612), said light pipe (600) configured to provide said output ray (L3) as an input to said projecting optics (612).

16. The apparatus of claim 1 wherein, said long dimension (606) of said light pipe (600) is at least an order of magnitude larger than said light pipe (600) width (W1, W11, W2, W22).

17. The apparatus of claim 1, wherein said output surface (S23) is oblique to said input surface (S01).

18. The apparatus of claim 1, wherein said output surface (S23) is generally opposite from, and non-adjacent to, said input surface (S01).

19. An apparatus comprising:
  a light pipe (600) including at least:
    (i) a first optical structure (P1) having a first refractive index ($\eta_1$), an input surface (S01) at a proximal end of said lightpipe (600) through which light from a light source enters said light pipe (600), and a second surface (S12), and
    (ii) a second optical structure (P2) having a second refractive index ($\eta_2$) not equal to said first refractive index, a third surface (S21), and an output surface (S23) at a distal end of said lightpipe (600) through which light exits said light pipe (600), wherein said output surface (S23) is oblique to said input surface (S01),
  said light pipe (600) having a longitudinal axis (R1) parallel to a long dimension (606) of said first optical structure (P1) in a direction between said input surface (S01), and said second surface (S12), and
  an interface (620) between said second surface (S12) and said third surface (S21) being oblique to said longitudinal axis (R1) of said light pipe (600) such that an input light ray (L0) to said input surface (S01) injected parallel to said longitudinal axis (R1) is output from said output surface (S23) as an output light ray (L3) non-parallel to said input light ray (L0).

* * * * *